(12) United States Patent
Hoek et al.

(10) Patent No.: US 10,780,404 B2
(45) Date of Patent: *Sep. 22, 2020

(54) POLYANILINE MEMBRANES, USES, AND METHODS THERETO

(71) Applicant: The Regents of the University of California, Oakland, CA (US)

(72) Inventors: Eric M. Hoek, Pacific Palisades, CA (US); Richard B. Kaner, Pacific Palisades, CA (US); Gregory R. Guillen, Yucaipa, CA (US); Thomas P. Farrell, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/366,532

(22) Filed: Mar. 27, 2019

(65) Prior Publication Data

US 2019/0217254 A1    Jul. 18, 2019

Related U.S. Application Data

(63) Continuation of application No. 14/434,266, filed as application No. PCT/US2013/064641 on Oct. 11, 2013, now Pat. No. 10,265,662.

(Continued)

(51) Int. Cl.
*B01D 71/60* (2006.01)
*C08K 5/17* (2006.01)
(Continued)

(52) U.S. Cl.
CPC ............ *B01D 71/60* (2013.01); *B01D 61/18* (2013.01); *B01D 67/0093* (2013.01);
(Continued)

(58) Field of Classification Search
CPC ...................................................... B01D 71/60
(Continued)

(56) References Cited

U.S. PATENT DOCUMENTS

| 4,504,529 A | 3/1985 | Sorensen et al. |
| 4,976,860 A | 12/1990 | Takahashi et al. |

(Continued)

FOREIGN PATENT DOCUMENTS

| CA | 1148834 A | 6/1983 |
| CN | 101274221 A | 10/2008 |

(Continued)

OTHER PUBLICATIONS

Cheng et al., "Film climbing of particle-laden interfaces," Colloids and Surfaces A: Physicochemical and Engineering Aspects, 315:275-284 (2008).

(Continued)

*Primary Examiner* — Michael M Dollinger
(74) *Attorney, Agent, or Firm* — Foley Hoag LLP; David P. Halstead; Alexander J. Chatterley

(57) ABSTRACT

Disclosed herein are methods of increasing the hydrophilicity of a membrane. Membranes comprising polyaniline or co-polymer thereof and one or more gel inhibiting agents are treated with one or more hydrophilicity restoration agents, thereby increasing the hydrophilicity of a membrane. Also disclosed are membranes produced by the disclosed methods. This abstract is intended as a scanning tool for purposes of searching in the particular art and is not intended to be limiting of the present invention.

7 Claims, 12 Drawing Sheets

Related U.S. Application Data

(60) Provisional application No. 61/713,439, filed on Oct. 12, 2012.

(51) Int. Cl.

| | | |
|---|---|---|
| *C08G 73/02* | (2006.01) | |
| *C08L 79/02* | (2006.01) | |
| *C08K 5/3435* | (2006.01) | |
| *C08K 5/42* | (2006.01) | |
| *B01D 67/00* | (2006.01) | |
| *B01D 69/08* | (2006.01) | |
| *B01D 71/76* | (2006.01) | |
| *B01D 61/18* | (2006.01) | |
| *B01D 61/14* | (2006.01) | |

(52) U.S. Cl.
CPC ............ *B01D 69/08* (2013.01); *B01D 71/76* (2013.01); *C08G 73/0266* (2013.01); *C08K 5/17* (2013.01); *C08K 5/3435* (2013.01); *C08K 5/42* (2013.01); *C08L 79/02* (2013.01); *B01D 61/145* (2013.01); *B01D 2323/02* (2013.01); *B01D 2325/36* (2013.01); *C08G 2340/00* (2013.01)

(58) Field of Classification Search
USPC ........................................................ 525/540
See application file for complete search history.

(56) References Cited

U.S. PATENT DOCUMENTS

| | | | |
|---|---|---|---|
| 5,096,586 A | | 3/1992 | Kaner et al. |
| 5,156,780 A | | 10/1992 | Kenigsberg et al. |
| 5,234,453 A | | 8/1993 | Smith et al. |
| 5,358,556 A | * | 10/1994 | Kaner .................. B01D 53/228 95/45 |
| 5,916,485 A | | 6/1999 | Besenhard et al. |
| 5,981,695 A | | 11/1999 | Mattes et al. |
| 6,429,282 B1 | | 8/2002 | Wang et al. |
| 6,465,120 B1 | | 10/2002 | Akita et al. |
| 6,797,325 B2 | | 9/2004 | Wang et al. |
| 7,033,639 B2 | | 4/2006 | Kelly et al. |
| 7,160,575 B1 | | 1/2007 | Pinto et al. |
| 7,250,189 B2 | | 7/2007 | Ji et al. |
| 7,309,385 B2 | | 12/2007 | Hong et al. |
| 7,455,891 B2 | | 11/2008 | Kunz et al. |
| 7,510,658 B2 | | 3/2009 | Gordon |
| 7,535,019 B1 | | 5/2009 | Sager et al. |
| 7,601,263 B2 | | 10/2009 | Ebert et al. |
| 7,780,875 B2 | | 8/2010 | Asgari |
| 7,850,798 B2 | | 12/2010 | Kaner et al. |
| 8,079,480 B2 | | 12/2011 | Haring et al. |
| 8,101,709 B1 | | 1/2012 | Kaner et al. |
| 8,470,203 B2 | | 6/2013 | Kaner et al. |
| 8,664,357 B2 | | 3/2014 | Livingston et al. |
| 9,017,773 B2 | | 4/2015 | D'Arcy et al. |
| 9,278,319 B2 | | 3/2016 | Hoek et al. |
| 2003/0136727 A1 | | 7/2003 | Yamada et al. |
| 2003/0138619 A1 | | 7/2003 | David et al. |
| 2003/0162939 A1 | | 8/2003 | Wang et al. |
| 2005/0131139 A1 | | 6/2005 | Kaner et al. |
| 2005/0238804 A1 | | 10/2005 | Garbar et al. |
| 2006/0284218 A1 | | 12/2006 | Kaner et al. |
| 2007/0007515 A1 | | 1/2007 | Suh et al. |
| 2007/0108420 A1 | | 5/2007 | Kuramoto |
| 2008/0048996 A1 | | 2/2008 | Hu et al. |
| 2008/0185294 A1 | | 8/2008 | Cai et al. |
| 2008/0203012 A1 | | 8/2008 | Yeager et al. |
| 2009/0305055 A1 | | 12/2009 | Shimizu |
| 2010/0025892 A1 | | 2/2010 | Jones et al. |
| 2010/0051538 A1 | | 3/2010 | Freeman et al. |
| 2010/0091275 A1 | | 4/2010 | Wang et al. |
| 2010/0092809 A1 | | 4/2010 | Drzal et al. |
| 2010/0224555 A1 | | 9/2010 | Hoek et al. |
| 2010/0300488 A1 | | 12/2010 | Watanabe et al. |
| 2010/0307974 A1 | | 12/2010 | Pettinger et al. |
| 2011/0073540 A1 | | 3/2011 | McGinnis et al. |
| 2011/0212027 A1 | | 9/2011 | Hoare et al. |
| 2011/0240556 A1 | | 10/2011 | Hoek et al. |
| 2011/0278175 A1 | | 11/2011 | Whitcombe et al. |
| 2011/0287551 A1 | | 11/2011 | Weiller et al. |
| 2012/0012520 A1 | | 1/2012 | Lee et al. |
| 2012/0043274 A1 | | 2/2012 | Chi et al. |
| 2012/0111791 A1 | | 5/2012 | Freeman et al. |
| 2012/0248031 A1 | | 10/2012 | Kerres et al. |
| 2012/0255897 A1 | | 10/2012 | Lu et al. |
| 2013/0020243 A1 | | 1/2013 | Han et al. |
| 2015/0273404 A1 | | 10/2015 | Hoek et al. |
| 2015/0273521 A1 | | 10/2015 | D'Arcy et al. |
| 2016/0082399 A1 | | 3/2016 | Hoek et al. |
| 2016/0136585 A1 | | 5/2016 | Hoek et al. |
| 2017/0050153 A1 | | 2/2017 | Hoek et al. |

FOREIGN PATENT DOCUMENTS

| | | |
|---|---|---|
| CN | 102258950 A | 11/2011 |
| DE | 19916802 A1 | 10/2001 |
| EP | 1466934 A1 | 10/2004 |
| EP | 1792948 A1 | 6/2007 |
| JP | H02220373 A | 9/1990 |
| JP | H 04104869 A | 4/1992 |
| JP | H04341333 A | 11/1992 |
| JP | H 06169079 A | 6/1994 |
| JP | H07-507000 A | 8/1995 |
| JP | 2005233637 A | 9/2005 |
| JP | 2006-192398 A | 7/2006 |
| JP | 2008-201635 A | 9/2008 |
| JP | 2009-146576 A | 7/2009 |
| JP | 2009-295378 A | 12/2009 |
| KR | 2000000000662 | 1/2000 |
| RU | 2176928 C2 | 12/2001 |
| WO | WO-1992/03217 A1 | 3/1992 |
| WO | WO-97/44121 A1 | 11/1997 |
| WO | WO-2010/068839 A2 | 6/2010 |
| WO | WO-2011/087913 A1 | 7/2011 |
| WO | WO-2012/102678 A1 | 8/2012 |
| WO | WO-2012/135679 A2 | 10/2012 |
| WO | WO-2012/149141 A1 | 11/2012 |
| WO | WO-2013/130143 A2 | 9/2013 |
| WO | WO-2013/155453 A1 | 10/2013 |
| WO | WO-2014/059339 A1 | 4/2014 |
| WO | WO-2014/186552 A1 | 11/2014 |
| WO | WO-2015/012869 A1 | 1/2015 |
| WO | WO-2015/157227 A1 | 10/2015 |

OTHER PUBLICATIONS

Dictionary.com, "Light Mineral Oil," p. 1-3 (2015).

Extended European Search Report dated Mar. 21, 2013, for European Patent Application No. 09832594.7.

Extended European Search Report issued by the European Patent Office in corresponding Application No. EP 15777181.7, dated Oct. 25, 2017.

Ferreira, et al., "Transport of metallic ions through polyaniline-containing composite membranes," J Chem Eng Data, 55: 4801-4807 (2010).

Guillen et al., "Pore-structure, hydrophilicity, and particle filtration characteristics of polyaniline-polysulfone ultrafiltration membranes," Journal of Materials Chemistry, 20:4621-4628 (2010).

Huang et al., "Novel chlorine resistant low-fouling ultrafiltration membrane based on a hydrophilic polyaniline derivative," Journals of Chemistry A (2015).

International Search Report dated Dec. 2, 2013, from PCT/US2013/052348.

International Search Report dated Feb. 20, 2014, from PCT/US13/64641.

International Search Report dated Jun. 30, 2015 from PCT/US2015/024635.

International Search Report dated Sep. 25, 2014, from PCT/US2014/038155.

(56) References Cited

OTHER PUBLICATIONS

ISR dated Aug. 19, 2013 from WO13/155453.
ISR dated Jul. 13, 2010 from PCT/US2009/067628.
Japanese Office Action dated Dec. 2, 2014, from JP 2012-548961.
Jaymand, "Recent progress in chemical modification of polyaniline," Prog Polym Sci, 38(9):1287-1306 (2013).
Langer, Jerzy J., "N-Substituted Polyanilines I. Poly(N-Methylaniline) and Related Copolymers," Synthetic Metals, 35:295-300 (1990).
Liao et al., "Highly dispersible polypyrrole nanospheres for advanced nanocomposite ultrafiltration membranes," Materials Horizons (2013).
Lindfors et al., "Potentiometric and UV-vis characterization of N-substituted polyanilines," Journal of Electroanalytical Chemistry, 535:65-74 (2002).
Manohar et al., "N-Substituted Derivatives of Polyaniline," Synthetic Metals, 29:E349-E356 (1989).
Massey, "Effects of UV Light and Weather on Plastics and Elastomers—Chapter 30.1: Polyethylene Terephthalate Weathering Properties," William Andrew Publishing, p. 167-172 (2007).
Matsunaga et al., "Surface changes brought about by corona discharge treatment of polyetheylene film and the effect on subsequent microbial colonisation," Polymer Degradation and Stability, 70:325-332 (2000).
McVerry et al., "Fabrication of Low-Fouling Ultrafiltration Membranes Using a Hydrophilic, Self-Doping Polyaniline Additive," Chemistry of Materials, 25:3597-3602 (2013).
Sairam et al., "Nanoporous asymmetric polyaniline films for filtration of organic solvents," J Membrane Sci, 330(1-2):166-174 (2009).
Sedenkova et al., "Chemical degradation of polyaniline by reaction with Fenton's reagent—a spectroelectrochemical study," Chemical Papers, 67(8):961-971-2013).
Shadi et al., "Synthesis and Characterization of N- and O-Alkylated Poly[aniline-co-N-(2-hydroxyethyl) aniline]," Journal of Applied Polymer Science, 124:2118-2126 (2012).
Song et al., "Conducting Polyaniline Nanowire and Its Applications in Chemiresistive Sensing," Nanomaterials, 3:498-523 (2013).
Supplementary European Search Report for European Patent Application No. EP 14797886.0 dated Feb. 16, 2017.
Supplementary European Search Report issued by the European Patent Office, dated Apr. 13, 2016, in corresponding EP Application No. 13845639.
Tan et al., "Characterization and transport properties of Nafion/polyaniline composite membranes," the Journal of Physical Chemistry. B, 109(49):23480-23490 (2005).
Written Opinion for International Application No. PCT/US2009/067628 dated Jul. 13, 2010.
Xia, et al., "Camphorsulfonic acid fully doped polyaniline emeraldine salt: conformations in different solvents studied by an ultraviolet/visible/near-infrared spectroscopic method," Chem Mater, 7: 443-445 (1995).

* cited by examiner

POLYANILINE MEMBRANES, USES, AND METHODS THERETO

CROSS-REFERENCE TO RELATED APPLICATIONS

This Application is a continuation of U.S. patent application Ser. No. 14/434,266, filed Apr. 8, 2015, which is the U.S. National-Stage application of PCT/US2013/064641, filed Oct. 11, 2013, which claims the benefit of U.S. Provisional Application No. 61/713,439, filed on Oct. 12, 2012, each of which is incorporated herein by reference in its entirety.

BACKGROUND

The conducting polymer, polyaniline, has historically been used to make sensors [1-3], battery electrodes [4], electromagnetic shielding devices [5, 6], and anticorrosion coatings [7-9]. Polyaniline has recently attracted attention as a membrane material [10-12]. The processability of polyaniline is somewhat limited to specific solvents. Gel-inhibitor agents have been used in solvent systems to increase the processability of polyaniline. However, the resulting membrane have a higher hydrophobicity when a gel-inhibitor agent is used which can negatively impact the performance and maintenance of the membrane.

Accordingly, described herein are membranes, methods of making membranes, and uses of membranes, wherein membranes produced with a gel-inhibiting agent have been treated to increase the hydrophilicity of membrane.

SUMMARY OF THE INVENTION

In accordance with the purpose(s) of the invention, as embodied and broadly described herein, the invention, in one aspect, relates to methods that increases the hydrophilicity of a membrane comprising polyaniline or co-polymer thereof and one or more gel inhibiting agents.

Disclosed herein is a method of increasing membrane hydrophilicity comprising steps of: (a) providing a membrane comprising polyaniline, a polyaniline derivative, or co-polymer thereof and one or more gel inhibiting agents; and (b) treating the membrane with one or more hydrophilicity restoration agents, thereby increasing the hydrophilicity of the membrane.

Also disclosed herein are membranes subjected to the methods disclosed herein.

Also disclosed herein are articles of manufacture comprising one or more membranes disclosed herein.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE FIGURES

The accompanying figures, which are incorporated in and constitute a part of this specification, illustrate several aspects and together with the description serve to explain the principles of the invention.

Figure 1:
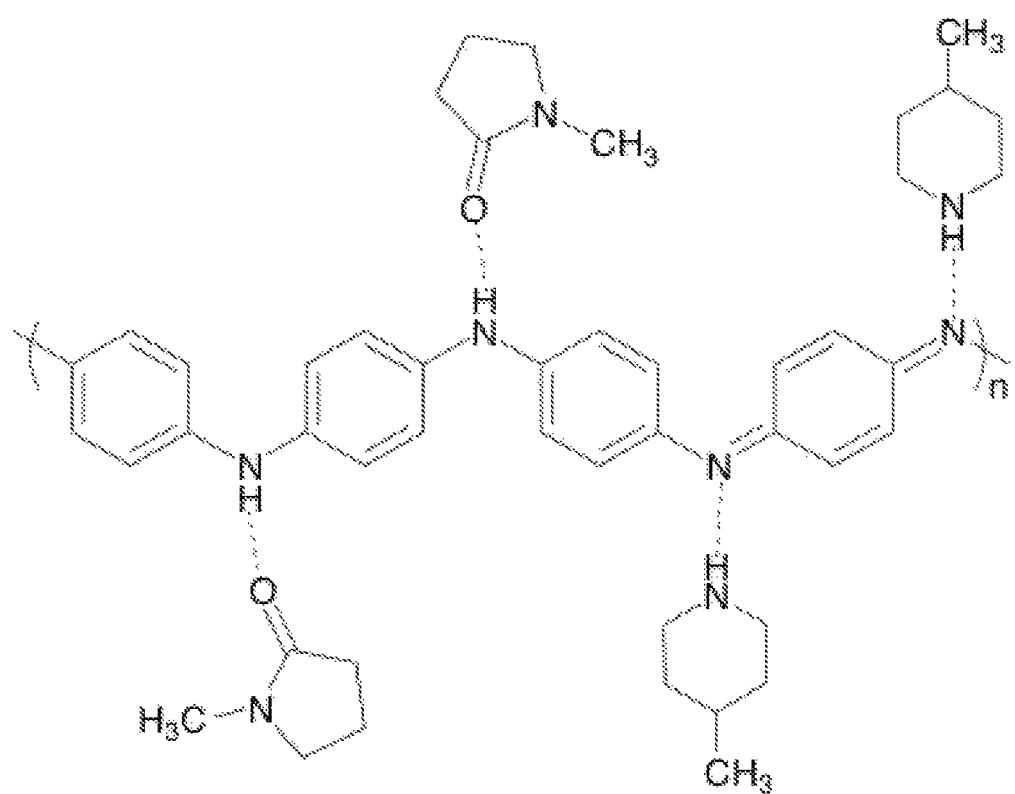
FIG. 1 shows the potential hydrogen bonding interactions between the emeraldine base form of polyaniline (PANi), the solvent 1-methyl-2-pyrrolidinone (NMP), and the gel inhibitor 4-methylpiperidine (4MP).

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION

A. Definitions

As used in the specification and the appended claims, the singular forms "a," "an" and "the" include plural referents unless the context clearly dictates otherwise. Thus, for example, reference to "a functional group," "an alkyl," or "a residue" includes mixtures of two or more such functional groups, alkyls, or residues, and the like.

Ranges can be expressed herein as from "about" one particular value, and/or to "about" another particular value.

When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

As used herein, the term "derivative" refers to a compound (e.g. a polymer) having a structure derived from the structure of a parent compound (e.g., polyaniline) and whose structure is sufficiently similar to those disclosed herein and based upon that similarity, would be expected by one skilled in the art to exhibit the same or similar properties and utilities as the parent compound. Exemplary derivatives include esters, amides, alkyl substitutions, and other suitable substitutions of a parent compound.

As used herein, the terms "optional" or "optionally" means that the subsequently described event or circumstance can or cannot occur, and that the description includes instances where said event or circumstance occurs and instances where it does not.

The term "contacting" as used herein refers to bringing a substance, for example a hydrophilicity restoration agent, and membrane together in such a manner that the substance can interact with the membrane.

As used herein, the terms "effective amount" and "amount effective" refer to an amount that is sufficient to achieve the desired result or to have an effect on an undesired condition. For example, an "effective amount of a hydrophilicity restoration agent" refers to an amount that is sufficient to achieve the desired increase in hydrophilicity of a membrane.

B. Hydrophilicity

Wettability of Solid Surfaces.

The classical definition of "lyophilic" or "wetting" is a liquid contact angle less than 90 degrees, whereas "lyophobic" or "non-wetting" is a liquid contact angle greater than 90 degrees. According to the Dupre equation, the solid-liquid interfacial free energy derives from the difference between the solid (1), liquid (3), and solid-liquid (13) interfacial tensions. (A. Dupre, *Theorie Mecanique de la Chaleur*; Gauthier-Villars: Paris, 1869) The solid-liquid interfacial free energy is calculated directly from the liquid contact angle using the Young-Dupre equation, $$-\Delta G_{13} = \gamma_3 \left(1 + \frac{\cos\theta_3}{r}\right), \quad (1)$$

which is derived by combining the Dupre equation with the Young equation. (T. Young, "An Essay on the Cohesion of Fluids," *Philosophical Transactions of the Royal Society of London* 1805, 95, 65-87). In fact, eq (1) is a modified form of the Young-Dupre equation that accounts for the excess interfacial area created by surface roughness as suggested by Wenzel. In eq (2), r is the actual surface area of a roughened solid surface, which can be derived from Atomic Force Microscopy (AFM) surface area difference (a.k.a., Wenzel's "roughness factor" or the ratio of actual surface area to geometric surface area). (R. N. Wenzel, *Industrial and Engineering Chemistry* 1936, 28, 988-994).

Components of Solid Surface Tension and their Determination.

According to van Oss, the total surface tension of any media is the sum of apolar (Lifshitz-van der Waals) and polar (Lewis acid-base) components, or $$\gamma^{TOT} = \gamma^{LW} + \gamma^{AB}, \quad (2)$$

where $\gamma^{AB}$ ($=2\sqrt{\gamma^+\gamma^-}$) is the acid-base component, $\gamma^+$ and $\gamma^-$ are electron-acceptor and electron-donor components, and $\gamma^{LW}$ is the Lifshitz-van der Waals component. (C. J. van Oss, *Interfacial Forces in Aqueous Media*; Marcel Dekker, Inc.: New York, N.Y., 1994). Individual surface tension components are determined from contact angles measured using three probe liquids of known surface tension and calculated by the extended Young equation, $$\left(1 + \frac{\cos\theta}{r}\right)\gamma_l^{TOT} = 2\left(\sqrt{\gamma_s^{LW}\gamma_l^{LW}} + \sqrt{\gamma_s^+\gamma_l^-} + \sqrt{\gamma_s^-\gamma_l^+}\right) \quad (3)$$

where $\theta$ is the equilibrium contact angle of a probe liquid on the surface, $\gamma_l^{TOT}$ is the total liquid surface tension. The subscripts s and l represent the solid surface and the probe liquid, respectively.

Interfacial Free Energy, Hydrophilicity and Fouling Resistance.

The interfacial free energy at contact, $\Delta G_{132}^{IF}$, offers additional insight into the inherent stability of a solid material (1) interacting through a liquid media (3) with another solid material (2). It accounts for interactions between the two solid surfaces, between water molecules and each of the solid surfaces, and among water molecules themselves. The interfacial free energy gives an indication of the thermodynamic tendency of the surfaces to be attracted or repelled by one another and is determined from, (D. Myers, *Surfaces, Interfaces, and Colloids: Principles and Applications*; 2nd ed.; John Wiley & Sons: New York, N.Y., 1999)

$$\Delta G_{132}^{IF} = \Delta G_{132}^{LW} + \Delta G_{132}^{AB}, \quad (4a)$$

$$\Delta G_{132}^{LW} = 2(\sqrt{\gamma_3^{LW}} - \sqrt{\gamma_1^{LW}})(\sqrt{\gamma_2^{LW}} - \sqrt{\gamma_3^{LW}}), \quad (b)$$

$$\Delta G_{132}^{AB} = 2\sqrt{\gamma_3^+}(\sqrt{\gamma_1^-} + \sqrt{\gamma_2^-} - \sqrt{\gamma_3^-}) + 2\sqrt{\gamma_3^-}(\sqrt{\gamma_1^+} + \sqrt{\gamma_2^+} - \sqrt{\gamma_3^+}) - 2\sqrt{\gamma_1^+\gamma_2^-} - 2\sqrt{\gamma_1^-\gamma_2^+}. \quad (c)$$

If surface 1 and 2 are the same material (i.e., 2=1), $\Delta G_{131}^{IF}$ indicates the interfacial free energy of cohesion at contact. This is the most fundamental thermodynamic definition of "hydrophilicity" and "hydrophobicity. The term "hydrophilicity" and the like terms, as used herein, refer to is the interfacial free energy of cohesion at contact as determined by the value of $\Delta G_{131}^{IF}$. $\Delta G_{131}^{IF}$ is measured in mJ/m². If $\Delta G_{131}^{IF}$ is a positive value (i.e. above 0), then a material is considered "hydrophilic" because there is an energy barrier preventing the surfaces from spontaneously contacting (i.e., hydrophilic repulsion or hydration energy). In contrast, if cohesive free energy is negative the two surfaces would spontaneously come together expelling water from between them; this is known as hydrophobic attraction or the hydrophobic effect. Also, a material is "more hydrophilic" or "less hydrophobic" as compared to another material if the material has a larger positive or less negative value of $\Delta G_{131}^{IF}$ as compared to the other material.

The terms "increasing the hydrophilicity" or "increases hydrophilicity" or the like terms, as used herein, refer to an increase in the value of $\Delta G_{131}^{IF}$. For example, the value can be increased from a negative number (i.e. -20) to a less negative number (i.e. -5). In another example, the value can be increased from a negative number (i.e. -20) to a positive number (i.e. 5). In yet another example, the value can be increased from a positive value (i.e. 5) to a more positive value (i.e. 20). All these examples fall within the definition of "increasing the hydrophilicity" or "increases hydrophilicity." A non-limiting example for a method that increases the value of $\Delta G_{131}^{IF}$ of a membrane with 5 mJ/m² can, for example, increase the value of $\Delta G_{131}^{IF}$ from -10 mJ/m² to -5 mJ/m², or from -3 mJ/m² to 2 mJ/m², or from 5 mJ/m² to 10 mJ/m² of the membrane.

If surfaces 1 and 2 are different materials (e.g., a bacteria cell and a membrane), $\Delta G_{131}^{IF}$ indicates the interfacial free energy of adhesion at contact. The term "adhesion propensity" and the like terms, as used herein, refer to the interfacial free energy of adhesion at contact as determined by the value of $\Delta G_{131}^{IF}$. $\Delta G_{131}^{IF}$ is measured in mJ/m². The adhesion propensity describes the thermodynamic favorability of two surfaces comprised of different materials coming into contact when separated by water. Thus, a positive adhesive free energy indicates that energy must be input to expel water from between the two material surfaces and force them together, while a negative free energy indicates adhesion is a spontaneous process. The adhesion propensity of a material is determinative of the fouling resistance of the material (i.e. a polyaniline membrane). A larger negative value of $\Delta G_{131}^{IF}$ is associated with a material (e.g., a membrane) and a foulant (e.g., a bacteria cell) that would be highly fouling prone and difficult to clean because it is energetically favorable for the foulant to remain adhered to the material. A positive and value of $\Delta G_{131}^{IF}$ is associated with a material that would be less fouling prone and easy to clean.

The terms "increasing the adhesion propensity" or "increases adhesion propensity" or the like terms, as used herein, refer to increasing the value of $\Delta G_{131}^{IF}$. For example, the value can be increased from a negative number (i.e. -20) to a less negative number (i.e. -5). In another example, the value can be increased from a negative number (i.e. -20) to a positive number (i.e. 5). In yet another example, the value can be increased from a positive value (i.e. 5) to a more positive value (i.e. 20). All these examples fall within the definition of "increasing the adhesion propensity" or "increases adhesion propensity." An increase in adhesion propensity of a material is indicative of an increase of the "fouling resistance" of the material (i.e. a polyaniline membrane). A non-limiting example for a method that increases the value of $\Delta G_{131}^{IF}$ of a membrane with 5 mJ/m² can, for example, increase the value of $\Delta G_{131}^{IF}$ from -10 mJ/m² to -5 mJ/m², or from -3 mJ/m² to 2 mJ/m², or from 5 mJ/m² to 10 mJ/m² of the membrane.

Polymers containing polar functional groups (most often O, N, S, and P containing moieties) are sometimes described and thought of as hydrophilic. In the case of membranes, the term "hydrophilic" is often used synonymously with "fouling resistant" but there has been some confusion in the literature about apparently hydrophilic polymers (according to classical definitions of wettability and hydrophilicity) being somewhat fouling prone (e.g., PSf, PES, PC, and PEI). Perhaps for water treatment membranes, a special case should be considered. van Oss points out that when two materials with significant mixed polar functionality (i.e., seemingly "hydrophilic" but containing both electron donor and electron acceptor) that they can be thermodynamically attracted to one another through Lewis acid-base attraction (see eq. 4c). (C. J. van Oss, *The Properties of Water and their Role in Colloidal and Biological Systems*; Academic Press/Elsevier Ltd.: New York, N.Y., 2008) Through the third and fourth terms of eq. 4c, such materials can introduce negative AB interfacial free energy, and in particular, when the electron donor or acceptor surface tension components of either of the solid materials are less than those of water. This phenomenon affects both the free energy of cohesion and adhesion; hence, seemingly "hydrophilic" materials may actually produce negative "hydrophobic" free energies of cohesion or adhesion.

C. Methods of Increasing Hydrophilicity of a Membrane

Polyaniline's processability has been a concern with the choice of solvent generally limited to NMP and N,N'-dimethylpropyleneurea (DMPU) [13, 14]. Interchain and intrachain hydrogen bonding between the imine and amine nitrogens in the emeraldine base form of PANi causes aggregation and the eventual formation of a gel. As many as 3 to 4 hydrogen bonds may form between the tetrameric repeat unit in PANi emeraldine base in an NMP solution [15]. Gelation can occur at PANi concentrations of less than 1 wt % [16-18] and often takes place in a very short time interval [19-21]; hence, the high concentrations desirable for membrane formation (ca. 15-25%) are with few exceptions generally not possible.

Gel-inhibiting agents, typically secondary and tertiary amine additives, help alleviate some of these PANi processability problems [22, 23]. Gel-inhibiting agents hydrogen bond to the imine nitrogens and thereby prevent gelation by inter-chain hydrogen bonding [24-28]. FIG. 1 illustrates the interaction and hydrogen bonding expected to occur between the emeraldine base form of PANi and the gel inhibitor 4MP in NMP. While these additives provide a means to produce concentrated PANi solutions from which robust membranes can be formed, gel-inhibiting agents may alter the polymer structure and chemistry. This can negatively alter film mechanical strength, conductivity, hydrophilicity, etc. [14, 27-31]. More hydrophobic membranes are more prone to fouling and, ultimately, need to be cleaned more frequently and require higher operating pressures, which requires more energy and is more costly, over time to maintain productivity [32-44].

Disclosed herein is a method of increasing membrane hydrophilicity comprising steps of: (a) providing a membrane comprising polyaniline, a polyaniline derivative, or co-polymer thereof and one or more gel inhibiting agents;

and (b) treating the membrane with one or more hydrophilicity restoration agents, thereby increasing the hydrophilicity of the membrane. The disclosed method increases and/or restores the hydrophilicity of the membrane comprising polyaniline or co-polymer thereof and one or more gel inhibiting agents. Thus, in one aspect, the method makes the membrane less prone to fouling and can also increase the mechanical strength, conductivity and/or hydrophilicity of the membrane.

The preparation of solutions comprising polyaniline or co-polymer thereof and the one or more gel inhibiting agent which can be used to form membranes are described in U.S. Pat. Nos. 5,981,695; 6,123,883; 6,429,282; 6,797,325; and 7,563,484 which are all herein incorporated by in their entirety by reference.

In one aspect, the solution comprising polyaniline or co-polymer thereof and the one or more gel inhibiting agent which can be used to form membranes can comprise a solvent comprising N-methyl-2-pyrrolidinone, N-ethyl-2-pyrrolidinone, 1-cyclohexyl-2-pyrrolidinone, 1-methyl-2-piperidone, N-methylcaprolactam, 1,5-dimethyl-2-pyrrolidinone 2pyrrolidinone, 1,3-dimethyl-2-imidazolidinone, 1,3-dimethyl-3,4,5,6-tetrahydro-2(1H)-pyrimidinone, 1-methyl-2-pyridone, 1-acetylpyrrolidine, 1-acetylpiperdine, 4-acetylmorpholine, 1-acetyl-3-methylpiperidine, N,N-dimethylpropionamide, N,N,N',N'-tetramethyurea, N,N-dimethylacetamide, dimethylsulfoxide, tetrametylene sulfoxide, hexamethylphosphoramide, Δ-valerolactam, or N,N-2-trimethylpropionamide, or a combination thereof. For example, the solution comprising polyaniline or co-polymer thereof and the one or more gel inhibiting agent which can be used to form membranes can comprise a solvent comprising 1-methyl-2-pyrrolidinone.

In one aspect, the membrane comprises polyaniline, a polyaniline derivative, and a co-polymer thereof. For example, the membrane can comprise polyaniline and/or the membrane can comprise a polyaniline derivative and/or the membrane can comprise a polyaniline co-polymer. In another example, the membrane comprises polyaniline. In yet another example, the membrane comprises a polyaniline derivative. In yet another example, the membrane comprises a polyaniline co-polymer. In yet another example, the membrane comprises a polyaniline derivative co-polymer. A polyaniline co-polymer can be a polymer which comprises aniline repeat units, such as a PANi emeraldine base tetramer. Thus, a polyaniline co-polymer can be a random or block co-polymer.

In one aspect, the one or more gel inhibiting agents comprises a primary amine, secondary amine, or a tertiary amine, or a combination thereof. For example, the one or more gel inhibiting agents comprises a primary amine or secondary amine, or combination thereof. In another example, the one or more gel inhibiting agents comprises a secondary amine.

In one aspect, the secondary amine comprises 4-methylpiperidine, 2-methylaziridine, azetidine, pyrrolidine, piperidine, hexamethyleneimine, heptamethyleneimine, 3-pyrroline, 3-pyrrolidinol, (R)-(−)-pyrrolidine-2-methanol, (S)-(+)-pyrrolidine-2-methanol, 4-ethyl-2-methyl-(3-methylbutyl)oxazolidine, (S)-(+)-(anilinomethyl)pyrrolidine, 1,3,3-trimethyl-6-azabicyclo[3,2,1]octane, (S)-(+)-(methoxymethyl)pyrrolidine, indoline, thiomorpholine, decahydroquinoline, 2,6-dimethylmorpholine, diethylamine, dicyclohexylamine, dipropylamine, dibutylamine, N-methylhexylamine, 1-aza-15-crown-5, 1,2,3,6-tetrahydropyridine, 1,4,5,6-tetrahydropyrimidine, 1,4-dioxa-8-azaspiro[4.5]-decane, 3,3-dimethylpiperidine, morpholine, or 3,5-dimethylpiperidine, or a combination thereof.

In one aspect, the primary amine comprises cyclopropylamine, n-butylamine, cyclobutylamine, cyclohexylamine, amylamine, t-amylamine, 2-amino-1-methoxypropane, 4-aminomorpholine, (+/−)-exo-2-aminonorbornane, 1,2-diaminopropane, 1,2-diaminocyclohexane, cyclooctylamine, 1,4-diaminobutane, 1-aminopiperidine, 1-aminohomopiperidine, tetrahydrofurfurylamine, furfurylamine, 1,2-diamino-2-methylpropane, 1-methyl-4-(methylamino)piperidine, or 4-(2-aminoethyl)morpholine, or a combination thereof.

In one aspect, the tertiary amine comprises N-Methylpiperidine, N,N'-Dimethylpiperazine, or triethylamine, or a combination thereof.

In one aspect, the one or more gel inhibiting agents comprises 4-methylpiperidine, n-Butylamine, 2,5-dimethyl-3-pyrroline, 3,3-dimethylpiperidine, heptamethyleneimine, diisopropylamine, hexamethyleneimine, N-ethylbenzylamine, piperazine, 2,6-dimethylmorpholine, piperidine, dibutylamine, N-methylpiperidine, N,N'-dimethylpiperazine, or diethylnipecotinamide, triethylamine or a combination thereof. For example, the one or more gel inhibiting agents can comprise 4-methylpiperidine.

In one aspect, the membrane comprising polyaniline or co-polymer thereof and one or more gel inhibiting agents can be made from a solution comprising a mole ratio of polyaniline or co-polymer thereof to one or more gel inhibiting agents of 0.1 to 5:0.1 to 10, such as, for example, a mole ratio of 1:2. In one aspect, the ratio of polyaniline or co-polymer thereof to one or more gel inhibiting agents can be a ratio capable to form a membrane, wherein prevent gelation by inter-chain hydrogen bonding between the emeraldine base form of PANi. Such ration can for example be a 1:2 mole ratio of polyaniline or co-polymer thereof to one or more gel inhibiting agents.

In one aspect, the membrane comprising the polyaniline or co-polymer thereof and the one or more gel inhibiting agents comprises at least 0.1% by weight of the one or more gel inhibiting agents. For example, the membrane comprising the polyaniline or co-polymer thereof and the one or more gel inhibiting agents comprises at least 0.1%, 0.5%, 1%, 3%, 5%, 7.5%, 10%, 15%, 20%, or 30%, by weight of the one or more gel inhibiting agents.

In one aspect, the membrane comprising the polyaniline or co-polymer thereof and the one or more gel inhibiting agents is cast on a substrate, such as a fabric.

In one aspect, the membrane comprising the polyaniline or co-polymer thereof and the one or more gel inhibiting agents has a surface porosity of less than 5%, 4%, 3%, 2%, 1%, 0.8%, 0.6%, 0.4%, 0.2%, 0.1%, or 0.05%. For example, the membrane comprising the polyaniline or co-polymer thereof and the one or more gel inhibiting agents has a surface porosity of less than 1%, 0.8%, 0.6%, 0.4%, 0.2%, 0.1%, or 0.05%, such as for example, less than 0.4% or 0.2%.

In one aspect, the membrane comprising the polyaniline or co-polymer thereof and the one or more gel inhibiting agents has an average pore size diameter of less than 20 nm, 15 nm, 10 nm, 7.5 nm, 5 nm, or 2.5 nm. For example, the membrane comprising the polyaniline or co-polymer thereof and the one or more gel inhibiting agents has an average pore size diameter of less than 10 nm, 7.5 nm, 5 nm, or 2.5 nm, such as for example, less than 7.5 nm or 5 nm.

In one aspect, the treating comprises contacting the membrane with the hydrophilicity restoration agent for at least 15 min, 30 min, 45 min, 60 min, 90 min, 120 min or 180 min.

For example, the treating comprises contacting the membrane with the hydrophilicity restoration agent for at least 15 min. In another example, the treating comprises contacting the membrane with the hydrophilicity restoration agent for at least 60 min.

In one aspect, treating the membrane comprising the polyaniline or co-polymer thereof and the one or more gel inhibiting agents with one or more hydrophilicity restoration agents comprises treating the membrane with an effective amount of the one or more hydrophilicity restoration agents to increase the hydrophilicity of the membrane.

In one aspect, the treating comprises filtering the membrane with one or more hydrophilicity restoration agents. In one aspect, the filtering comprises filtering the membrane with the hydrophilicity restoration agent for at least 15 min, 30 min, 45 min, 60 min, 90 min, 120 min or 180 min. For example, the filtering comprises filtering the membrane with the hydrophilicity restoration agent for at least 15 min. In another example, the filtering comprises filtering the membrane with the hydrophilicity restoration agent for at least 60 min.

In one aspect, the one or more hydrophilicity restoration agents comprises an organic sulfonic acid. The organic sulfonic acid can be a mono- or di-sulfonic acid. In one aspect, the organic sulfonic acid comprises C1-C12 substituted or unsubstituted alkyl, C1-C12 substituted or unsubstituted alkenyl, C1-C12 substituted or unsubstituted alkyl, C1-C12 substituted or unsubstituted cycloalkyl, C1-C12 substituted or unsubstituted heteroaryl, C1-C12 substituted or unsubstituted heterocyclyl. For example, the organic sulfonic acid comprises C3-C12 substituted or unsubstituted alkyl, C3-C12 substituted or unsubstituted alkenyl, C3-C12 substituted or unsubstituted alkyl, C3-C12 substituted or unsubstituted cycloalkyl, C3-C12 substituted or unsubstituted heteroaryl, C3-C12 substituted or unsubstituted heterocyclyl. In another example, the organic sulfonic acid comprises C6-C12 substituted or unsubstituted alkyl, C6-C12 substituted or unsubstituted alkenyl, C6-C12 substituted or unsubstituted alkyl, C6-C12 substituted or unsubstituted cycloalkyl, C6-C12 substituted or unsubstituted heteroaryl, C6-C12 substituted or unsubstituted heterocyclyl.

In one aspect, the one or more hydrophilicity restoration agents comprises (+/−) camphor-10-sulfonic acid, sulfuric acid, methane sulfonic acid, ethane sulfonic acid, propanesulfonic acid, perfluoropropanesulfonic acid, butane sulfonic acid, perfluorobutane sulfonic acid, hexane sulfonic acid, perfluorohexane sulfonic acid, perfluorooctanesulfonic acid, benzene sulfonic acid, toluene sulfonic acid, dodecyl benzene, sulfonic acid, taurine (2-aminoethanesulfonic acid), homotaurine (3-aminopropanesulfonic acid), naphthalene sulfonic acid, 2,5 naphthalene disulfonic acid, dinonylnaphthalene sulfonic acid, dinonlynaphthalene disulfonic acid, polyvinylsulfonate, or polystyrenesulfonate, or a combination thereof. For example, the one or more hydrophilicity restoration agents comprises (+/−) camphor-10-sulfonic acid, methane sulfonic acid, ethane sulfonic acid, propanesulfonic acid, perfluoropropanesulfonic acid, butane sulfonic acid, perfluorobutane sulfonic acid, hexane sulfonic acid, perfluorohexane sulfonic acid, perfluorooctanesulfonic acid, benzene sulfonic acid, toluene sulfonic acid, dodecyl benzene, sulfonic acid, taurine (2-aminoethanesulfonic acid), homotaurine (3-aminopropanesulfonic acid), naphthalene sulfonic acid, 2,5 naphthalene disulfonic acid, dinonylnaphthalene sulfonic acid, dinonlynaphthalene disulfonic acid, polyvinylsulfonate, or polystyrenesulfonate, or a combination thereof. In another example, the one or more hydrophilicity restoration agents can comprise (+/−) camphor-10-sulfonic acid, such as (−) camphor-10-sulfonic acid or (+) camphor-10-sulfonic acid, or a combination thereof.

In one aspect, the membrane has a negative $\Delta G_{131}^{IF}$ value before treatment. For example, the membrane can have a negative $\Delta G_{131}^{IF}$ value of less than −2, −4, −6, −8, −10, −15, or −20 mJ/m$^2$ before treatment. For example, the membrane can have a negative $\Delta G_{131}^{IF}$ value of less than −8 mJ/m$^2$ before treatment. In one aspect, the membrane can have a negative $\Delta G_{131}^{IF}$ value from −2 to −20 mJ/m$^2$ before treatment.

In one aspect, the membrane has a positive value of $\Delta G_{131}^{IF}$ after treatment. In one aspect, the membrane has a positive value of $\Delta G_{131}^{IF}$ of at least 1, 5, 10, 15, 20, 25, 30, or 50 mJ/m$^2$ after treatment. For example, the membrane can have a positive value of $\Delta G_{131}^{IF}$ of at least 10 mJ/m$^2$ after treatment. In another aspect, the membrane can have a positive value of $\Delta G_{131}^{IF}$ from 1 to 50 mJ/m$^2$ after treatment. For example, the membrane can have a positive value of $\Delta G_{131}^{IF}$ from 5 to 25 mJ/m$^2$ after treatment.

In one aspect, the membrane has an increased value of $\Delta G_{131}^{IF}$ of at least 5, 10, 15, 20, 25, 30, 50, 75, or 100 mJ/m$^2$ after treatment. For example, the membrane can have an increased value of $\Delta G_{131}^{IF}$ of at least 5, 10, 15, 20, 25, 30, or 50 J/m$^2$ after treatment, such as at least 20, 25, or 30 J/m$^2$ after treatment. In another aspect, the membrane can have an increased value of $\Delta G_{131}^{IF}$ from 5 to 100 mJ/m$^2$ after treatment. For example, the membrane can have an increased value of $\Delta G_{131}^{IF}$ from 5 to 50 mJ/m$^2$ after treatment, such as from 20 to 50 mJ/m$^2$ after treatment.

In one aspect, the membrane has a decreased adhesion propensity after treatment.

In another aspect, the membrane has an increased fouling resistance after treatment.

In one aspect, the membrane has a positive value of $\Delta G_{132}^{IF}$ after treatment. In one aspect, the membrane has a positive value of $\Delta G_{132}^{IF}$ of at least 1, 5, 10, 15, 20, 25, 30, or 50 mJ/m$^2$ after treatment. For example, the membrane can have a positive value of $\Delta G_{132}^{IF}$ of at least 10 mJ/m$^2$ after treatment. In another aspect, the membrane can have a positive value of $\Delta G_{132}^{IF}$ from 1 to 50 mJ/m$^2$ after treatment. For example, the membrane can have a positive value of $\Delta G_{132}^{IF}$ from 5 to 35 mJ/m$^2$ after treatment.

In one aspect, the membrane has an increased value of $\Delta G_{132}^{IF}$ of at least 5, 10, 15, 20, 25, 30, 50, 75, or 100 mJ/m$^2$ after treatment. For example, the membrane can have an increased value of $\Delta G_{132}^{IF}$ of at least 5, 10, 15, 20, 25, 30, or 50 J/m$^2$ after treatment, such as at least 20, 25, or 30 J/m$^2$ after treatment. In another aspect, the membrane can have an increased value of $\Delta G_{132}^{IF}$ from 5 to 100 mJ/m$^2$ after treatment. For example, the membrane can have an increased value of $\Delta G_{132}^{IF}$ from 5 to 50 mJ/m$^2$ after treatment, such as from 20 to 50 mJ/m$^2$ after treatment.

In one aspect, the membrane has a positive value of $\Delta G_{132}^{IF}$ of at least 1, 5, 10, 15, 20, 25, 30, or 50 mJ/m$^2$ after treatment as measured against silica, polyethylene glycol (PEG), human serum albumin (HSA), hexadecane, *E. coli, S. cerevisiae*, and *P. putida*. For example, the membrane can have a positive value of $\Delta G_{132}^{IF}$ of at least 10 mJ/m$^2$ after treatment as measured against silica, PEG, HSA, hexadecane, *E. coli, S. cerevisiae*, and *P. putida*. In another aspect, the membrane can have a positive value of $\Delta G_{132}^{IF}$ from 1 to 50 mJ/m$^2$ after treatment as measured against silica, PEG, HSA, hexadecane, *E. Coli, S. cerevisiae*, and *P. putida*. For example, the membrane can have a positive value of $\Delta G_{132}^{IF}$ from 5 to 35 mJ/m² after treatment as measured against silica, PEG, HSA, hexadecane, E. coli, S. cerevisiae, and P. putida.

In one aspect, the membrane has an increased value of $\Delta G_{132}^{IF}$ of at least 5, 10, 15, 20, 25, 30, 50, 75, or 100 mJ/m² after treatment as measured against silica, PEG, HSA, hexadecane, E. coli, S. cerevisiae, and P. putida. For example, the membrane can have an increased value of $\Delta G_{132}^{IF}$ of at least 5, 10, 15, 20, 25, 30, or 50 J/m² after treatment, such as at least 20, 25, or 30 J/m² after treatment as measured against silica, PEG, HSA, hexadecane, E. coli, S. cerevisiae, and P. putida. In another aspect, the membrane can have an increased value of $\Delta G_{132}^{IF}$ from 5 to 100 mJ/m² after treatment as measured against silica, PEG, HSA, hexadecane, E. coli, S. cerevisiae, and P. putida. For example, the membrane can have an increased value of $\Delta G_{132}^{IF}$ from 5 to 50 mJ/m² after treatment, such as from 20 to 50 mJ/m² after treatment as measured against PEG, HSA, hexadecane, E. coli, S. cerevisiae, and P. putida.

In one aspect, the membrane has a positive value of $\Delta G_{132}^{IF}$ of at least 1, 5, 10, 15, 20, 25, 30, or 50 mJ/m² after treatment as measured against silica, PEG, HSA, hexadecane, E. coli, S. cerevisiae, or P. putida, or a combination thereof. For example, the membrane can have a positive value of $\Delta G_{132}^{IF}$ of at least 10 mJ/m² after treatment as measured against silica, PEG, HSA, hexadecane, E. coli, S. cerevisiae, or P. putida, or a combination thereof. In another aspect, the membrane can have a positive value of $\Delta G_{132}^{IF}$ from 1 to 50 mJ/m² after treatment as measured against silica, PEG, HSA, hexadecane, E. coli, S. cerevisiae, or P. putida, or a combination thereof. For example, the membrane can have a positive value of $\Delta G_{132}^{IF}$ from 5 to 35 mJ/m² after treatment as measured against silica, PEG, HSA, hexadecane, E. coli, S. cerevisiae, or P. putida, or a combination thereof.

In one aspect, the membrane has an increased value of $\Delta G_{132}^{IF}$ of at least 5, 10, 15, 20, 25, 30, 50, 75, or 100 mJ/m² after treatment as measured against silica, PEG, HSA, hexadecane, E. coli, S. cerevisiae, or P. putida, or a combination thereof. For example, the membrane can have an increased value of $\Delta G_{132}^{IF}$ of at least 5, 10, 15, 20, 25, 30, or 50 J/m² after treatment, such as at least 20, 25, or 30 J/m² after treatment as measured against silica, PEG, HSA, hexadecane, E. coli, S. cerevisiae, or P. putida, or a combination thereof.

In another aspect, the membrane can have an increased value of $\Delta G_{132}^{IF}$ from 5 to 100 mJ/m² after treatment as measured against silica, PEG, HSA, hexadecane, E. coli, S. cerevisiae, or P. putida, or a combination thereof. For example, the membrane can have an increased value of $\Delta G_{132}^{IF}$ from 5 to 50 mJ/m² after treatment, such as from 20 to 50 mJ/m² after treatment as measured against silica, PEG, HSA, hexadecane, E. coli, S. cerevisiae, or P. putida, or a combination thereof.

D. Membranes

Also disclosed herein are membranes comprising polyaniline, a polyaniline derivative, or a co-polymer thereof, wherein the membrane has been subjected to one or more of the methods disclosed herein. For example, the membranes comprising polyaniline or a co-polymer thereof can have been subjected to a method disclosed herein.

In one aspect, the membrane has a positive value of $\Delta G_{131}^{IF}$. In one aspect, the membrane can have a positive value of $\Delta G_{131}^{IF}$ of at least 1, 5, 10, 15, 20, 25, 30, or 50 mJ/m². For example, the membrane can have a positive value of $\Delta G_{131}^{IF}$ of at least 10 mJ/m². In another aspect, the membrane can have a positive value of $\Delta G_{131}^{IF}$ from 1 to 50 mJ/m². For example, the membrane can have a positive value of $\Delta G_{131}^{IF}$ from 5 to 25 mJ/m².

In one aspect, the membrane has a positive value of $\Delta G_{132}^{IF}$. In one aspect, the membrane has a positive value of $\Delta G_{132}^{IF}$ of at least 1, 5, 10, 15, 20, 25, 30, or 50 mJ/m². For example, the membrane can have a positive value of $\Delta G_{132}^{IF}$ of at least 10 mJ/m². In another aspect, the membrane can have a positive value of $\Delta G_{132}^{IF}$ from 1 to 50 mJ/m². For example, the membrane can have a positive value of $\Delta G_{132}^{IF}$ from 5 to 35 mJ/m².

In one aspect, the membrane has a positive value of $\Delta G_{132}^{IF}$ as measured against silica, PEG, HSA, hexadecane, E. coli, S. cerevisiae, and P. putida. In one aspect, the membrane has a positive value of $\Delta G_{132}^{IF}$ of at least 1, 5, 10, 15, 20, 25, 30, or 50 mJ/m² as measured against silica, PEG, HSA, hexadecane, E. coli, S. cerevisiae, and P. putida. For example, the membrane can have a positive value of $\Delta G_{132}^{IF}$ of at least 10 mJ/m² 3 as measured against PEG, HSA, hexadecane, E. coli, S. cerevisiae, and P. putida. In another aspect, the membrane can have a positive value of $\Delta G_{132}^{IF}$ from 1 to 50 mJ/m² as measured against silica, PEG, HSA, hexadecane, E. coli, S. cerevisiae, and P. putida. For example, the membrane can have a positive value of $\Delta G_{132}^{IF}$ from 5 to 35 mJ/m² as measured against silica, PEG, HSA, hexadecane, E. coli, S. cerevisiae, and P. putida.

In one aspect, the membrane has a positive value of $\Delta G_{132}^{IF}$ as measured against silica, PEG, HSA, hexadecane, E. coli, S. cerevisiae, or P. putida, or a combination thereof. In one aspect, the membrane has a positive value of $\Delta G_{132}^{IF}$ of at least 1, 5, 10, 15, 20, 25, 30, or 50 mJ/m² after treatment as measured against silica, PEG, HSA, hexadecane, E. coli, S. cerevisiae, or P. putida, or a combination thereof. For example, the membrane can have a positive value of $\Delta G_{132}^{IF}$ of at least 10 mJ/m² after treatment as measured against silica, PEG, HSA, hexadecane, E. coli, S. cerevisiae, or P. putida, or a combination thereof.

In another aspect, the membrane can have a positive value of $\Delta G_{132}^{IF}$ from 1 to 50 mJ/m² as measured against silica, PEG, HSA, hexadecane, E. coli, S. cerevisiae, or P. putida, or a combination thereof. For example, the membrane can have a positive value of $\Delta G_{132}^{IF}$ from 5 to 25 mJ/m² as measured against silica, PEG, HSA, hexadecane, E. coli, S. cerevisiae, or P. putida, or a combination thereof.

E. Article of Manufacture

Also disclosed herein is an article of manufacture comprising one or more of the membranes disclosed herein. For example, the article of manufacture can comprise a membrane disclosed herein.

In one aspect, the article of manufacture is a device for purifying. For example, the article of manufacture can be a device for purifying water fresh surface water, seawater ahead of desalination by reverse osmosis membranes, oily wastewater, municipal sewage or other industrial wastewaters. For example, the article of manufacture can be a device for separating proteins, purifying liquid food and beverage products, performing kidney dialysis.

F. Methods of Use

Also disclosed herein is a method for purifying water comprising the steps of: (a) providing a membrane disclosed herein, wherein the membrane has a first face and a second face; (b) contacting the first face of the membrane with a first solution of a first volume having a first salt concentration at a first pressure; and (c) contacting the second face of the membrane with a second solution of a second volume having a second salt concentration at a second pressure; wherein the first solution is in fluid communication with the second solution through the membrane, wherein the first salt concentration is higher than the second salt concentration, thereby creating an osmotic pressure across the membrane, and wherein the first pressure is sufficiently higher than the second pressure to overcome the osmotic pressure, thereby increasing the second volume and decreasing the first volume.

Also disclosed herein is a method for concentrating an impurity comprising the steps of: (a) providing a membrane disclosed herein, wherein the membrane has a first face and a second face; (b) contacting the first face of the membrane with a first mixture of a first volume having a first impurity concentration at a first pressure; (c) contacting the second face of the membrane with a second mixture of a second volume having a second impurity concentration at a second pressure; and (d) collecting the impurity, wherein the first mixture is in fluid communication with the second solution through the membrane, wherein the first impurity concentration is higher than the second impurity concentration, thereby creating an osmotic pressure across the membrane, and wherein the first pressure is sufficiently higher than the second pressure to overcome the osmotic pressure, thereby increasing the second volume and decreasing the first volume.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Several methods for preparing the compounds of this invention are illustrated in the following Examples. Starting materials and the requisite intermediates are in some cases are commercially available, or can be prepared according to literature procedures or as illustrated herein.

a. Example 1

The addition of the gel-inhibiting agent, 4-methylpiperidine (4MP), to polyaniline (PANi)/1-methyl-2-pyrrolidinone (NMP) mixtures produced stable polymer solutions at high polymer concentrations. Membranes cast from 18 polymer wt % PANi in NMP-4MP solutions were 98% less water permeable, but exhibited 91% greater protein rejection than those cast from 18 polymer wt % PANi in NMP. After phase inversion using deionized water, PANi-NMP membranes had water contact angles of 24° while PANi-NMP-4MP membranes had contact angles of 42°. This decrease in membrane hydrophilicity arose from a combination of hydrogen-bonded and ring-substituted 4MP/polyaniline associations. Chemical post-treatment with different acid and base solvents produced a range of water fluxes, protein rejections, interfacial hydrophilicities and mechanical properties. Post-treatment with camphorsulfonic acid completely removed the hydrogen-bonded fraction of 4MP from the polymer matrix and was most effective at recovering membrane hydrophilicity. The implications are that pure polyaniline ultrafiltration membranes can be made with excellent mechanical, interfacial and separation properties through use of gel-inhibitors and chemical post-treatments.

(a) Materials and Methods (i) Materials

Ultra-pure 18 MΩ deionized (DI) water was produced by a reverse osmosis system (RODI-C-12BL, Aqua Solutions, Inc.). Sulfuric acid (Sigma-Aldrich, No. 320501), ammonium peroxydisulfate (Fisher, No. A682), sodium hydroxide (Fisher, No. S612), methanol (Sigma-Aldrich, No. 322415), NMP (Sigma-Aldrich, No. 443778), 4MP (Sigma-Aldrich, No. M73206), hydrochloric acid (Sigma-Aldrich, No. 258148), p-toluenesulfonic acid monohydrate (PTSA) (Fisher, No. AC17178), (+/−) camphor-10-sulfonic acid (CSA) (AlfaAesar, No. A12620), 4-dodecylbenzenesulfonic acid (DBSA) (Sigma-Aldrich, No. 44198), ammonium hydroxide (Sigma-Aldrich, No. 320145)), bovine serum albumin (BSA) (Sigma-Aldrich, No. A9647), sodium chloride (Fisher, No. S271)), dimethyl sulfoxide-$d_6$ (Cambridge Isotope Laboratories, No. DLM-10), and potassium chloride (Fisher, No. P217) were all used as received.

(ii) Polymer Solution Preparation and Membrane Formation

Polyaniline was synthesized in our laboratory as previously reported in detail [12]. Polyaniline was dried in a vacuum oven (~25 in. Hg) at 50° C. overnight prior to addition to the solvents. Polymer solutions were prepared by adding 18 wt % crushed PANi powder to 82 wt % NMP (PANi-NMP) or a mixture of 72 wt % NMP and 10 wt % 4MP (PANi-NMP-4MP), i.e., 2 moles 4MP:mole PANi emeraldine base tetramer; 0.547 g 4MP/g PANi emeraldine base [15, 22, 26-28]. PANi was added to the solvent(s) over the course of 1 h while vigorously stirring. Polymer solutions were allowed to stir for 3 d in a tightly sealed glass vial.

PANi ultrafiltration membranes were formed by immersion precipitation [45]. Polymer solutions were allowed to stand sealed for 1 h before film casting. Films were spread using a casting knife (Gardco Adjustable Micrometer Film Applicator, Microm II, AP-99500701) with a blade height of 152 μm set using a feeler gauge. Films were hand-cast on a nonwoven polyester fabric (NanoH$_2$O, Inc., Los Angeles, Calif.) and immediately placed in a coagulation bath containing 3 liters of DI water at 20° C. The relative humidity during film casting was 50-55%. Membranes remained in the coagulation bath for 30 min before being transferred to plastic storage bags where they were soaked in DI water. Water in the storage bags was replaced with fresh DI water every 30 min for 2 h. Membranes were then stored at 4° C. in DI water prior to post-treatment and further characterization.

(iii) Membrane Post-Treatment

PANi UF membranes were post-treated by placing membrane coupons in beakers containing 150 ml aqueous solutions of 100 mM HCl, H$_2$SO$_4$, PTSA, CSA, DBSA, or NH$_4$OH. A similar post-treatment was carried out using DI water at 50° C. Gentle stirring was maintained at 125 rpm.

A special post-treatment intended to remove CSA from the membrane was carried out in 100 mM NH$_4$OH at 50° C. for 3 h with gentle stirring. CSA post-treatment was conducted using 100 mM CSA at 50° C. for 1 h unless otherwise noted.

(iv) Membrane Characterization

Membrane samples were cut for performance testing using a 25 mm punch (Osborne arch punch, OS-149-m25, Campbell Bosworth Machinery Co.). Samples were kept wet and placed in a dead-end stirred cell (UHP-25, Advantec MFS, Inc.) with a membrane area ($A_m$) of 3.5 cm$^2$. Permeate volumetric flow rates were measured using a digital HPLC liquid flow meter (FlowCal 5000, Tovatech, LLC). Membranes were compacted with DI water under 20 psi transmembrane pressure at 20° C. until a decrease in permeability of <5% over 30 min was achieved. Permeate volumetric flowrate ($Q_p$) was then recorded at transmembrane pressures ($\Delta p$) of 20, 10, and 5 psi. Membrane pure water permeabilities ($L_p$) were calculated from [46]:

$$L_p = \frac{Q_p}{A_m \cdot \Delta p} \quad (5)$$

Membrane protein rejection was measured immediately after the pure water permeability test. Residual water from the permeability test was removed from the stirred cell and replaced with a 10 ml solution of 1000 mg l$^{-1}$ BSA in 50 mM NaCl. BSA has a hydrodynamic diameter of 6 nm in this solution [12]. The stir rate was maintained at 350 rpm ($Re_{SC}$=2963). The stirred cell Reynolds number was calculated from $$Re_{SC} = \frac{\rho \cdot \omega \cdot r_{SC}^2}{\mu}, \quad (6)$$

where $\rho$ is the fluid density (kg m$^{-3}$), $\omega$ is the angular velocity (rad s$^{-1}$), $r_{SC}$ is the stirred cell radius (9×10$^{-3}$ m), and $\mu$ is the fluid dynamic viscosity (kg m$^{-1}$ s$^{-1}$) [47]. The stirred cell mass transfer coefficient ($k_{SC}$) of 4.1×10$^{-6}$ m s$^{-1}$ was calculated using [47]:

$$\frac{k_{SC} \cdot r_{SC}}{D} = Sh_{SC} = 0.27 Re_{SC}^{0.567} Sc^{0.33}, \quad (7)$$

where D is the diffusion coefficient of BSA (5.9×10$^{-11}$ m$^2$ s$^{-1}$), $Sh_{SC}$ is the stirred cell Sherwood number, and Sc is the Schmidt number (Sc=$\mu \cdot \rho^{-1} \cdot D^{-1}$). A constant transmembrane pressure was set to give an initial permeate flux ($J_v = Q_p/A_m$) of 40 gallons ft$^{-2}$ d$^{-1}$ (19 μm s$^{-1}$), and 5 ml of permeate was collected (50% recovery). Protein concentrations in the feed ($c_f$) and permeate ($c_p$) were determined by UV-vis absorption at =278 nm (DU® 730 Life Science UV/Vis Spectrophotometer, Beckman Coulter). Solute rejection ($R_s$) was calculated based on $$R_s = 1 - \frac{c_p}{c_f}. \quad (8)$$

Deionized water contact angles were measured using a goniometer (DSA10, KRÜSS GmbH). The captive bubble measurement technique was employed here due to the hydrophilicity of the PANi films. Ten drops were measured and the highest and lowest values were discarded. Fourier transform infrared (FTIR) (JASCO FT/IR-6300 with ATR PRO450-S ZnSe crystal) spectra were measured for each membrane. Films were dried in a desiccator overnight at 20° C. prior to measurement.

$^1$H-Nuclear Magnetic Resonance ($^1$H-NMR) studies were carried out in a Bruker Avance AV300 (300.1 MHz) instrument at room temperature. The membranes were not dried in vacuo or thermally to prevent NMP and/or 4MP from evaporating from the membranes. Saturated membrane solutions were prepared in DMSO-d$_6$ and the NMP/4MP standards were measured as neat solutions. The $^1$H-NMR chemical shifts were reported relative to the deuterated DMSO solvent signal.

Streaming current was measured using an adjustable gap electrokinetic analyzer (SurPASS Electrokinetic Analyzer, Anton-Paar GmbH). The flow channel gap was set at 100 μm, and a 1 mM KCl solution at 20° C. was used as the background electrolyte. Streaming current was determined in a pH range of 2-10, adjusted using HCl and NaOH. Membrane zeta potential ($\zeta$) was calculated using the Helmholtz-Smoluchowski equation, $$\zeta = \frac{dI}{dp} \cdot \frac{\mu}{\varepsilon \cdot \varepsilon_0} \cdot \frac{L}{A}, \quad (9)$$

where dI/dp is the slope of the streaming current versus pressure, $\mu$ is the solution dynamic viscosity, $\varepsilon$ is the dielectric constant of the solution, $\varepsilon_0$ is the vacuum permittivity, L is the streaming channel length and A is the cross-section of the streaming channel.

Membrane samples were prepared for SEM (Nova 600 NanoLab DualBeam™-SEM/FIB, FEI Company) by soaking in H$_2$SO$_4$ at pH 1 for 1 h to make PANi fully doped and electrically conducting. Samples were dried in a desiccator overnight at 20° C. Cross-sections were prepared from unsupported films by freeze fracturing using liquid nitrogen. Membrane surface SEM images were analyzed for porosity and pore size by a previously described procedure [12, 48].

Membrane tensile strength analyses were conducted on 5 mm×100 mm membrane samples. The thickness of the samples was measured using a micrometer before the analysis, and the average value of the thickness was used to calculate the result. All samples were placed in a United Testing Systems tensile test apparatus at 25° C., with a gauge length of 80 mm, and pulled at a rate of 2 mm min$^{-1}$. Two sets of sample conditions were used. One set of samples was measured under wet conditions, in which the samples were directly tested after removal from the water storage bags and dabbed dry using napkins. Another set of samples was tested under dried conditions, in which the samples were dried first in air for 1 h and then placed in a desiccator for 24 h.

Thermal gravimetric analyses (TGA) were conducted on a Seiko ExStar TG/DTA 6200 from Haake Instruments. The samples were measure under protection of N$_2$ flow (90 ml min$^{-1}$), with the heating rate at 2° C. min$^{-1}$, and temperature tested from 20-550° C. Samples were dried in a desiccator for 24 h prior to TGA measurements.

(b) Results (i) Effect of 4MP on PANi Processability

Adding 4MP in a 2:1 molar 4MP:PANi emeraldine base tetramer ratio improves the polymer solution quality. An 18 wt % PANi mixture containing 72 wt % NMP and 10 wt % 4MP produces a viable polymer solution within 1 d. A viable polymer solution is defined here as a mixture of polymer and solvent from which a membrane can be cast; non-viable polymer solutions form a gel within seconds that cannot be cast into a membrane. Polymer solutions containing our synthesized PANi with a 2:1 molar ratio of 4MP:PANi emeraldine base do not gel for several months. However, a PANi-NMP mixture without 4MP takes 2 d to form a viable polymer solution, and this polymer solution remains viable for 2-5 d before a gel forms. The addition of 4MP allows for the complete dissolution of PANi and greatly expands the window of polymer solution viability.

(ii) Effect of Chemical Post-Treatments on PANi Membrane Hydrophilicity

Captive bubble water contact angles for PANi-NMP membranes and untreated and post-treated PANi-NMP-4MP membranes are summarized in Table 1 along with molecular weight, anion dimensions, and $pK_a$ of the acids and bases used for post-treatment.

TABLE 1

| Membrane | Post-treatment | | | Contact Angle (°) |
|---|---|---|---|---|
| | MW (Da) | Anion Dimensions (Å) | $pK_a$ | |
| PANi-NMP | — | — | — | 24.2 ± 2.1 |
| PANi-NMP-4MP | — | — | — | 41.9 ± 1.6 |
| $H_2O$ | 18.0 | — | 15.7 | 40.5 ± 2.9 |
| HCl | 36.5 | 3.3 | −6.1 | 53.0 ± 4.1 |
| $H_2SO_4$ | 98.1 | 3.4, 2.5, 2.4 | −3.0, 2.0 | 43.7 ± 3.2 |
| PTSA | 190.2 | 7.0, 4.3, 2.5 | 0.7 | 44.5 ± 3.6 |
| CSA | 232.3 | 7.0, 5.4, 5.6 | 2.0 | 18.4 ± 1.0 |
| DBSA | 326.5 | 22.2, 5.0, 2.4 | 2.6 | 43.9 ± 2.9 |
| $NH_4OH$ | 35.0 | — | 9.2 | 47.1 ± 1.9 |
| CSA-$NH_4OH$ | — | — | — | 17.2 ± 1.1 |
| CSA-filter-acid-base-filter | — | — | — | 17.1 ± 0.5 |

Table 1 shows the molecular weight, anion dimensions, $pK_a$ of post-treatment molecules, and water contact angles for PANi-NMP-4MP membranes after 1 h post-treatments at 50° C.

Anion dimensions were approximated using Chem3D software (CambridgeSoft) via the protocol outlined by Yang et al. [28]. The dimension for the chloride ion is an ionic diameter [49]. The addition of 4MP to the polymer solution increases the membrane water contact angle from 22° to 42° (untreated) [12]. Post-treatment of this PANi-NMP-4MP membrane in $H_2O$ at 50° C. for 1 h does not alter the membrane water contact angle. Post-treatments for 1 h with 100 mM $H_2SO_4$, PTSA, and DBSA at 50° C. have little effect on membrane hydrophilicity. Post-treatments for 1 h with 100 mM HCl and $NH_4OH$ at 50° C. appear to increase membrane hydrophobicity. Post-treatment of the PANi-NMP-4MP membrane in 100 mM CSA for 1 h at 50° C., however, reduces membrane water contact angle to 18.4°. In an attempt to remove excess CSA from the membrane surface, CSA-post-treated PANi-NMP-4MP membranes were further treated for 3 h in 100 mM $NH_4OH$ at 50° C. (CSA-$NH_4OH$). This treatment does not further affect membrane hydrophilicity (contact angle=) 17.2°. A PANi-NMP-4MP membrane was extensively post-treated by the following process: 1 h treatment in 100 mM CSA at 50° C.→60 min filtration of DI $H_2O$ under 20 psi at 20° C.→10 min with 0.5 M $H_2SO_4$ treatment at 45° C.→10 min with 1 M NaOH treatment at 45° C.→30 min filtration with DI $H_2O$ under 20 psi at 20° C. This treatment is labeled "CSA-filter-acid-base-filter" in Table 1. CSA-treated membrane hydrophilicity was unaffected by the additional water filtration and acid and base treatments (contact angle=17.1°).

Figure 2:
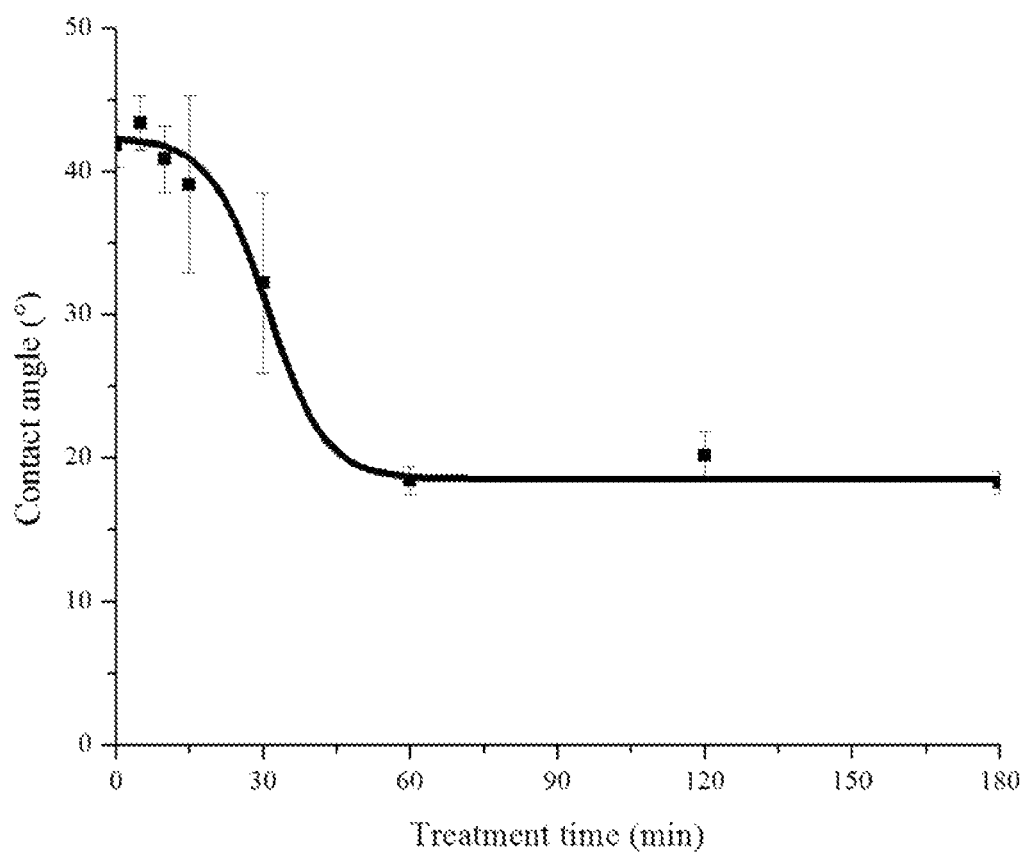
FIG. 2 shows the water contact angle for PANi-NMP-4MP membranes after 100 mM CSA post-treatments at 50° C. using differing time intervals.

The effect of CSA treatment time on membrane hydrophilicity is shown in FIG. 2. PANi-NMP-4MP membranes were treated with 100 mM CSA at 50° C. Membrane hydrophilicity began to increase after treatment for 10 min. There was a transitional time between 10 and 60 min where areas of the treated membrane remained relatively hydrophobic (contact angle=42°) while areas a few millimeters away had recovered hydrophilicity (contact angle <20°). This is the reason for the larger error bars for contact angle values at 15 and 30 min CSA treatment times. The maximum membrane hydrophilicity was achieved after 1 h of CSA treatment. The effect of CSA treatment temperature on membrane hydrophilicity is shown in Table 2. PANi-NMP-4MP membranes were treated with 100 mM CSA for 1 h. The membrane hydrophilicity was recovered at all temperatures tested.

TABLE 2

| Treatment temp. (° C.) | Contact angle (°) |
|---|---|
| 10 | 18.8 ± 1.2 |
| 20 | 17.6 ± 1.0 |
| 50 | 18.4 ± 1.0 |

Table 2 shows the water contact angles for PANi-NMP-4MP membranes after 1 h 100 mM CSA post-treatment at different temperatures.

(iii) Effect of CSA Post-Treatment on PANi Membrane Performance

Pure water permeability was measured for untreated and CSA-treated PANi-NMP-4MP membranes and is summarized in Table 3. It was previously reported a membrane pure water permeability of 1050 μm $s^{-1}$ $bar^{-1}$ with 0% BSA rejection for an 18 wt % PANi-82 wt % NMP membrane containing no 4MP [12]. Membrane permeability decreases by 98% upon addition of 10 wt % 4MP to the polymer solution. BSA protein rejection of the PANi-NMP-4MP membrane increases from 0% to 91%. Post-treatment of the PANi-NMP-4MP membrane with 100 mM CSA for 1 h at 50° C. decreases BSA rejection by ~15% with a slight decrease in permeability.

TABLE 3

| Membrane | Permeability (μm $s^{-1}$ $bar^{-1}$) | BSA rejection |
|---|---|---|
| PANi-NMP-4MP | 24.5 ± 3.0 | 0.91 ± 0.01 |
| PANi-NMP-4MP CSA-treated | 20.3 ± 4.4 | 0.74 ± 0.03 |

Table 3 shows the membrane pure water permeability and BSA rejection for untreated and CSA-post-treated membrane.

(iv) PANi Membrane Mechanical and Thermal Properties

Nonwoven support fabric and membrane thicknesses and tensile moduli are given in Table 4. The dried support fabric is about 13% thinner than the wet sample. Of the PANi membranes, only the untreated PANi-NMP membrane showed a minor decrease in thickness (7%). Post-treatment using 100 mM CSA at 50° C. had no effect on membrane thickness. Both CSA-treated and untreated PANi-NMP-4MP membranes showed no difference in wet/dry thickness. Tensile strength increases by adding a PANi layer to the support fabric. The PANi-NMP membrane has about double the breaking strength of the nonwoven fabric support. Tensile modulus decreases in the PANi-NMP-4MP membrane but is still greater than the support fabric. The PANi-NMP-4MP CSA-treated membrane has the greatest tensile modulus. This trend is the same for wet and dry membranes, with the dried membranes having a greater breaking strength.

TABLE 4

| Sample | Wet | | Dry | |
|---|---|---|---|---|
| | Thickness (μm) | Modulus (MPa) | Thickness (μm) | Modulus (MPa) |
| Nonwoven support | 170 ± 1 | 243 ± 26 | 148 ± 5 | 294 ± 21 |
| PANi-NMP | 230 ± 9 | 434 ± 66 | 214 ± 17 | 723 ± 61 |
| PANi-NMP-4MP | 224 ± 9 | 360 ± 65 | 223 ± 1 | 561 ± 90 |
| PANi-NMP-4MP CSA-treated | 222 ± 13 | 453 ± 98 | 220 ± 1 | 796 ± 28 |

Table 4 shows a nonwoven support and membrane thicknesses and tensile moduli for wet and dry testing conditions.

Figure 3:
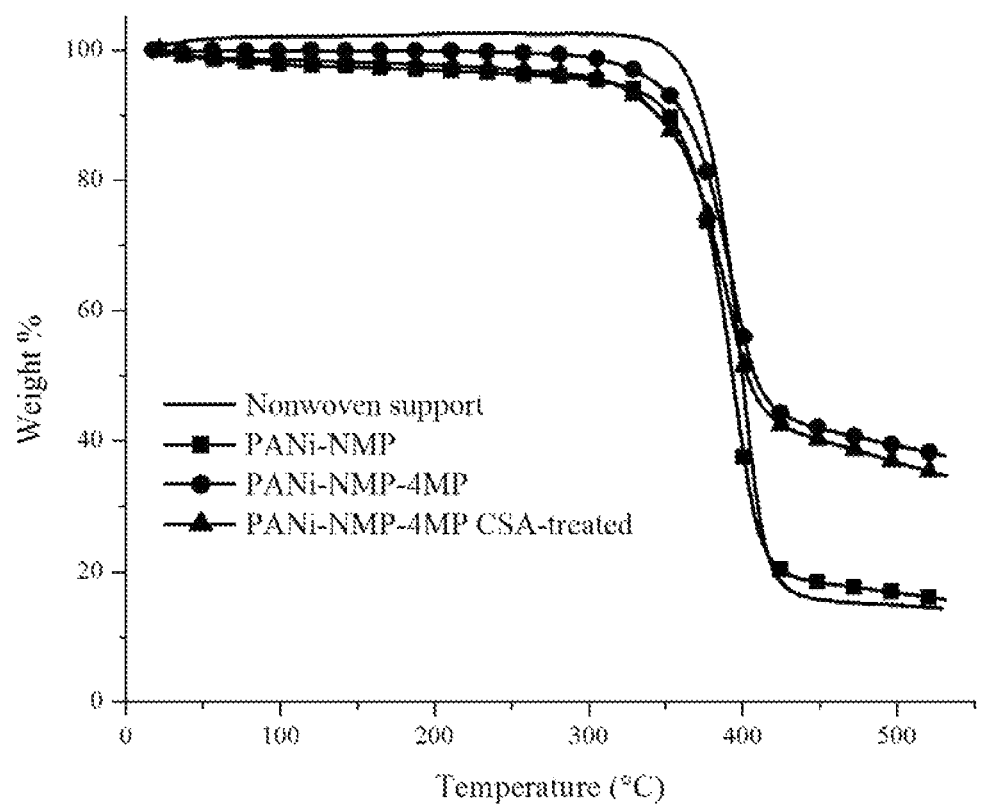
FIG. 3 shows the thermal decomposition of nonwoven support and PANi membranes.

TGA results are given in FIG. 3. All samples are thermally stable up to 300-330° C. before decomposition. The nonwoven support and the PANi-NMP membrane left ~15 wt % residues after decomposition, while the PANi-NMP-4MP and PANi-NMP-4MP CSA-treated membranes left ~35 wt % residues. Water loss was observed in all samples before 300° C., and the dried samples have <0.3 wt % water.

(v) Pam Membrane Chemical Properties

Figure 4:
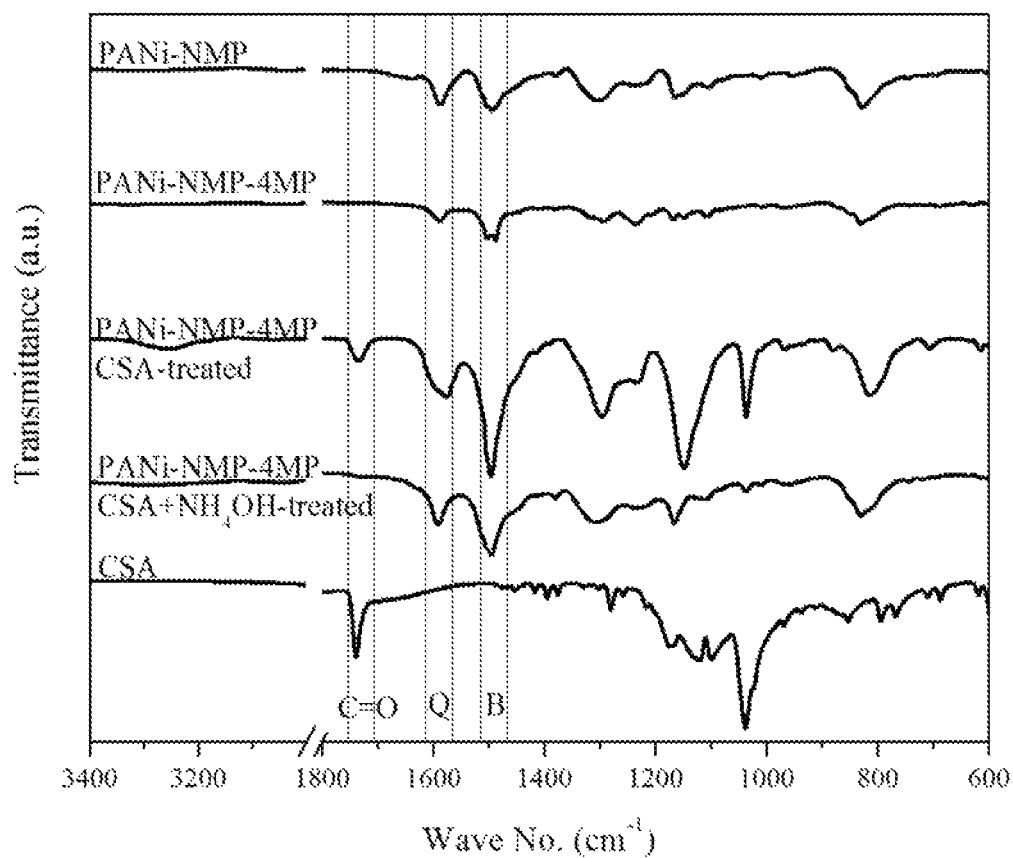
FIG. 4 shows the FTIR spectra for PANi membranes and CSA.

Fourier transform infrared (FTIR) spectroscopic analysis was carried out on an 18 wt % PANi-82 wt % NMP membrane (PANi-NMP), an 18 wt % PANi-72 wt % NMP-10 wt % 4MP membrane (PANi-NMP-4MP), an 18 wt % PANi-72 wt % NMP-10 wt % 4MP membrane treated for 1 h in 100 mM CSA at 50° C. (PANi-NMP-4MP CSA-treated), a CSA-treated 18 wt % PANi-72 wt % NMP-10 wt % 4MP membrane that was further treated with 100 mM $NH_4OH$ for 3 h at 50° C. (PANi-NMP-4MP CSA+$NH_4OH$-treated), and neat CSA. These spectra are shown in FIG. 4. The locations of carbonyls (C=O), quinoid rings (Q), and benzenoid rings (B) peaks are outlined. This spectrum matches very closely to those reported in previous studies [27, 50-53]. The spectrum for the CSA-treated PANi-NMP-4MP membrane exhibits a peak around 1740 $cm^{-1}$, which may correspond to the presence of the C=O bond of CSA. This peak is prominent in the neat CSA spectrum and is greatly diminished after $NH_4OH$ treatment. The locations and ratios of quinoid to benzenoid peaks for each membrane are shown in Table 5. The ratio of quinoid (1587 $cm^{-1}$) to benzenoid (1495 $cm^{-1}$) peaks (Q/B) for the PANi-NMP membrane is 0.87, which matches values of the Q/B ratio found by others [27, 28]. The Q/B ratio of the PANi-NMP-4MP membrane decreases to 0.52. There is no shift in Q peak between PANi-NMP and PANi-NMP-4MP membranes.

TABLE 5

| | Wave No. ($cm^{-1}$) | | |
|---|---|---|---|
| Membrane | Q | B | Q/B ratio |
| PANi-NMP | 1587 | 1495 | 0.87 |
| PANi-NMP-4MP | 1588 | 1502 | 0.52 |
| PANi-NMP-4MP CSA-treated | 1576 | 1496 | 0.43 |
| PANi-NMP-4MP CSA + $NH_4OH$-treated | 1591 | 1496 | 0.64 |

Table 5 shows the locations of quinoid and benzenoid FTIR peaks and Q/B ratios for PANi membranes.

Figure 5:
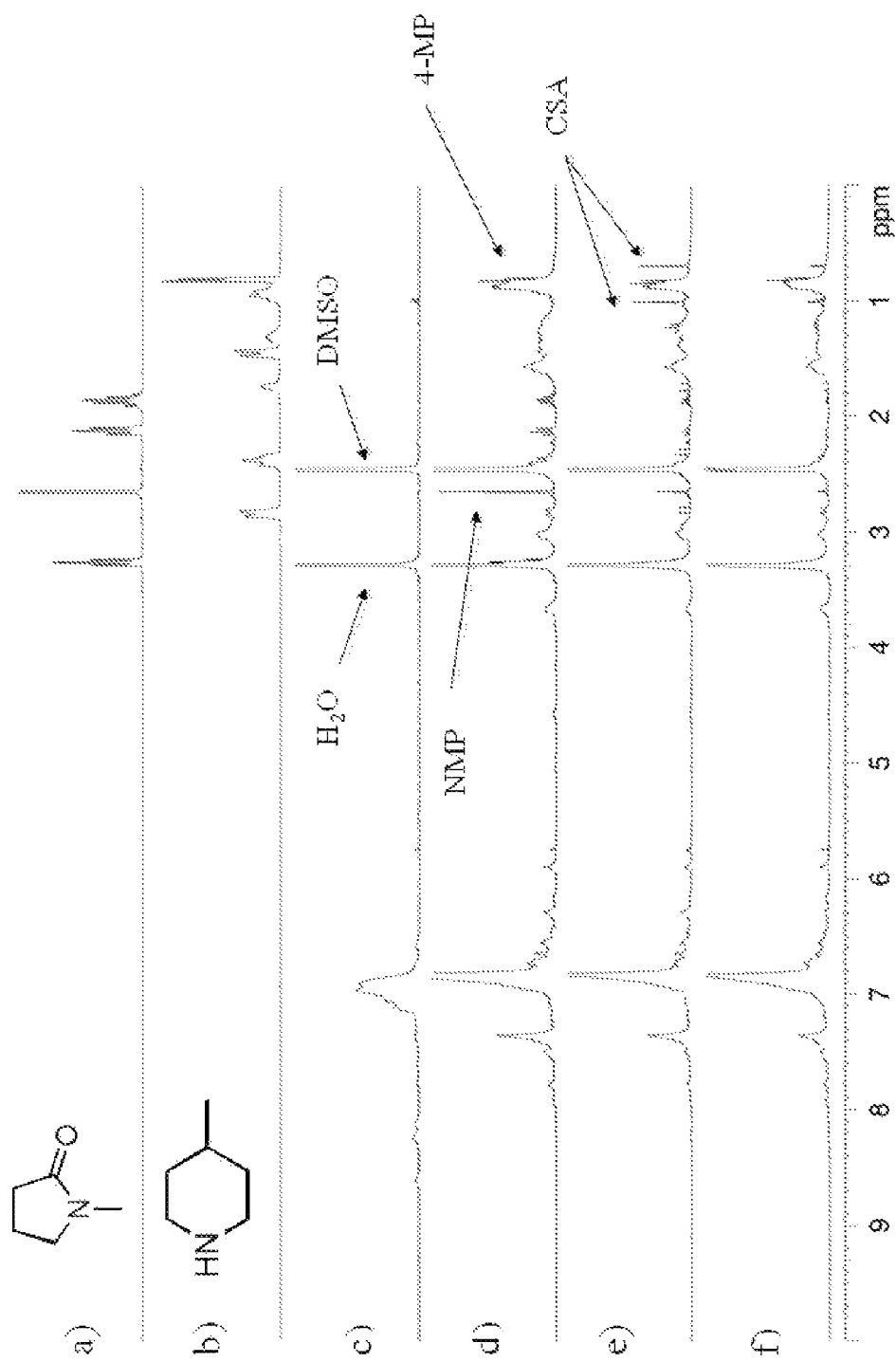
FIG. 5 shows the $^1$H NMR spectra for a) NMP, b) 4MP, c) a PANi-NMP membrane, d) a PANi-NMP-4MP membrane, e) a CSA-treated PANi-NMP-4MP membrane, and f) a $NH_4OH$-CSA-treated PANi-NMP-4MP membrane.

$^1$H NMR experiments were performed to further investigate the composition of the PANi membranes before and after 1 h of 100 mM CSA at 50° C. treatment. $^1$H NMR spectra are shown in FIG. 5. Spectra of NMP (a) and 4MP (b) have been included for reference. The NMR spectrum of the PANi-NMP membrane made without 4MP (c) indicates that NMP is completely removed from the membrane during the phase inversion process. When 4MP is used as a gel-inhibitor in the polymer solution, some 4MP and NMP remain in the membrane after the phase inversion process (d). This is shown by the singlet at δ=2.66 ppm, which is indicative of the N—$CH_3$ protons in NMP and the multiplet at δ=0.91-0.81 ppm that can be attributed to the proton attached to the methyl group and the proton attached to the ring at the 4-position of the 6-membered ring in 4MP. Upon treatment with 100 mM CSA, a fraction of the NMP and 4MP is removed from the membrane (e). Quantitatively the amount of NMP and 4MP removed by CSA treatment cannot be interpreted due to the increased number of signals in the aromatic region when PANi is doped with a strong acid. However, it is observed that more NMP than 4MP is removed by CSA post-treatment. Additionally, CSA remains in the membrane after treatment and washing with DI water, as shown by two peaks at δ=1.01 and 0.70 ppm that can be attributed to the two primary methyl groups on CSA. Treatment with 100 mM $NH_4OH$ (f) reduces the peaks at δ=1.01 and 0.70 ppm, but they are still observed. Since the samples could not be dried using heat or vacuum, there is still some residual water in each membrane.

(vi) PANi Membrane Surface Charge Characteristics

Figure 6:
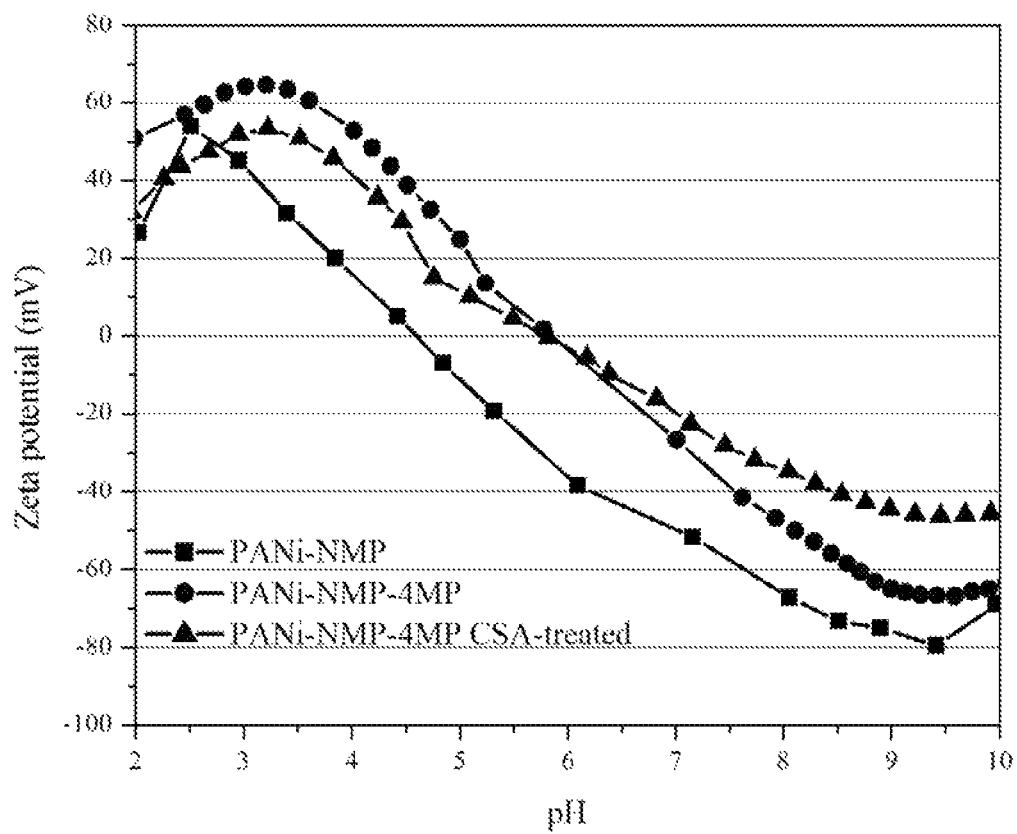
FIG. 6 shows the Zeta potentials of PANi membranes determined by streaming current measurements.
Figure 7:
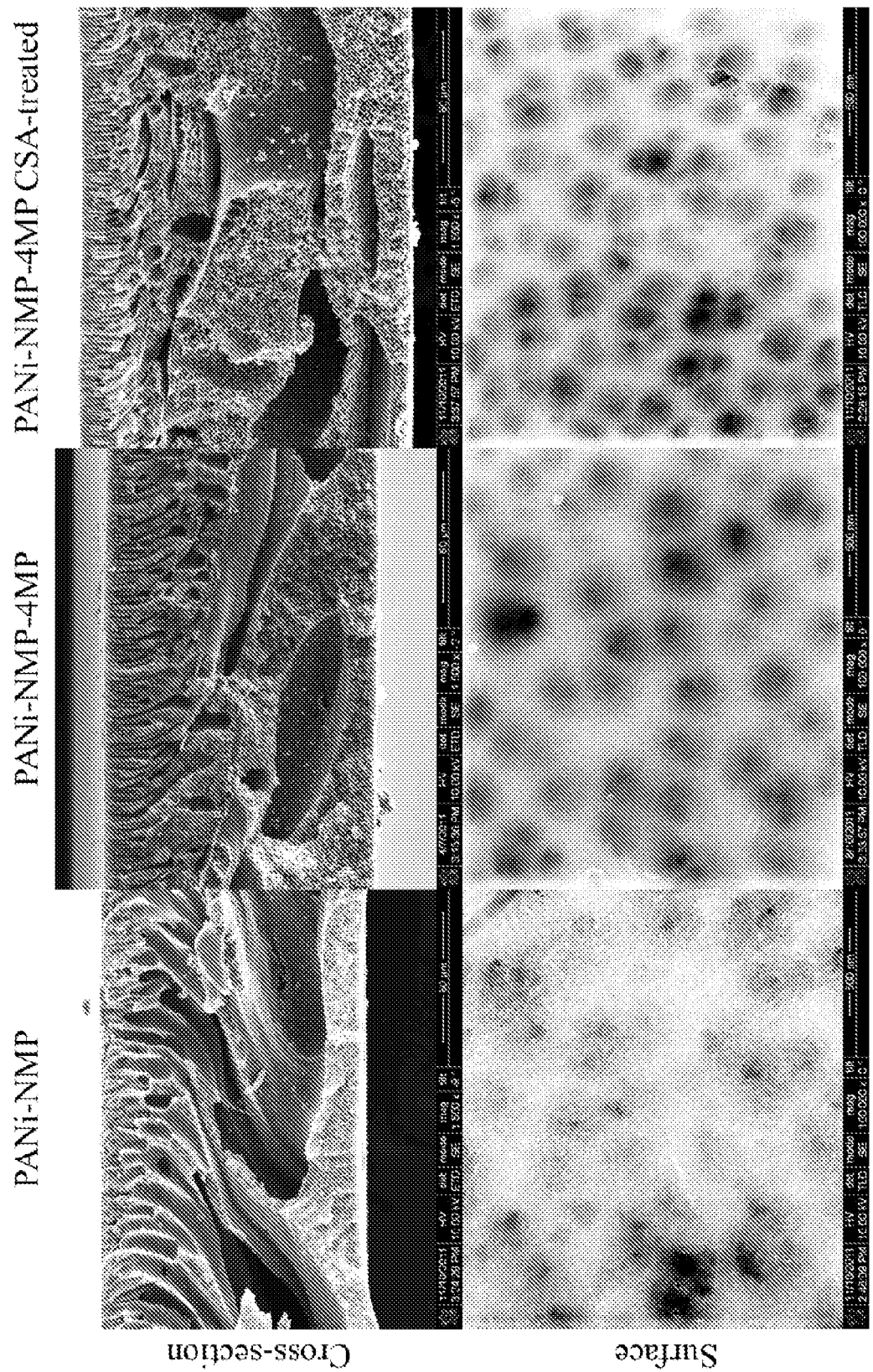
FIG. 7 shows PANi membrane cross-sections and surface SEM images.

The membrane surface charge for PANi-NMP, PANi-NMP-4MP, and PANi-NMP-4MP CSA-treated membranes are shown in FIG. 6. Streaming current measurements show that the addition of 4MP produces a more positively charged membrane as indicated by a shift in the isoelectric point from 4.5 to 5.8. The PANi-NMP membrane has a zeta potential of −50 mV at pH 7, while both untreated and CSA-treated PANi-NMP-4MP membranes have zeta potentials of −20 to −25 mV at pH 7. CSA post-treatment decreases the magnitude of the membrane zeta potential.

(vii) PANi Membrane Surface and Cross-Sectional Morphology

Surface and cross-sectional SEM images for PANi-NMP, PANi-NMP-4MP, and CSA-treated PANi-NMP-4MP membranes are shown in FIG. 6. SEM cross-sections show that these membranes have an asymmetric structure with finger-like macrovoids. The addition of 4MP produces a membrane with less void space when compared to the PANi-NMP membrane. CSA post-treatment does not appear to affect the membrane void structure. The membrane surface porosity and average pore diameter are presented in Table 6. Surface porosity and average pore diameter are reduced upon addition of 4MP. CSA post-treatment increases both surface porosity and average pore diameter.

TABLE 6

| Membrane | ε | $d_p$ (nm) |
| --- | --- | --- |
| PANi-NMP | 2.8% ± 1.3% | 8.8 ± 0.6 |
| PANi-NMP-4MP | 0.2% ± 0.1% | 5.0 ± 0.6 |
| PANi-NMP-4MP CSA-treated | 0.4% ± 0.3% | 5.5 ± 0.1 |

Table 6 shows the surface porosity (ε) and average pore diameter ($d_p$) of PANi membranes determined by SEM image analysis.

(c) Discussion

The addition of 4MP to a PANi-NMP polymer solution affects PANi beyond disrupting interchain and intrachain PANi hydrogen bonding. The strong basicity ($pK_a$=11.3) and size (7.29 Å) of 4MP are very similar to heptamethyleneimine (HPMI), which has a $pK_a$=11.2 and size of 7.16 Å, respectively [28]. HPMI is a PANi gel-inhibitor that has been shown to reduce the quinoid structure in PANi EB to the benzenoid via ring substitution [27]. The decrease in the FTIR Q/B ratio from 0.87 to 0.52 for membranes cast using 4MP indicates that there may be some ring substitution, however, the lack of Q peak shift may show there is no covalent bonding.

Figure 8:
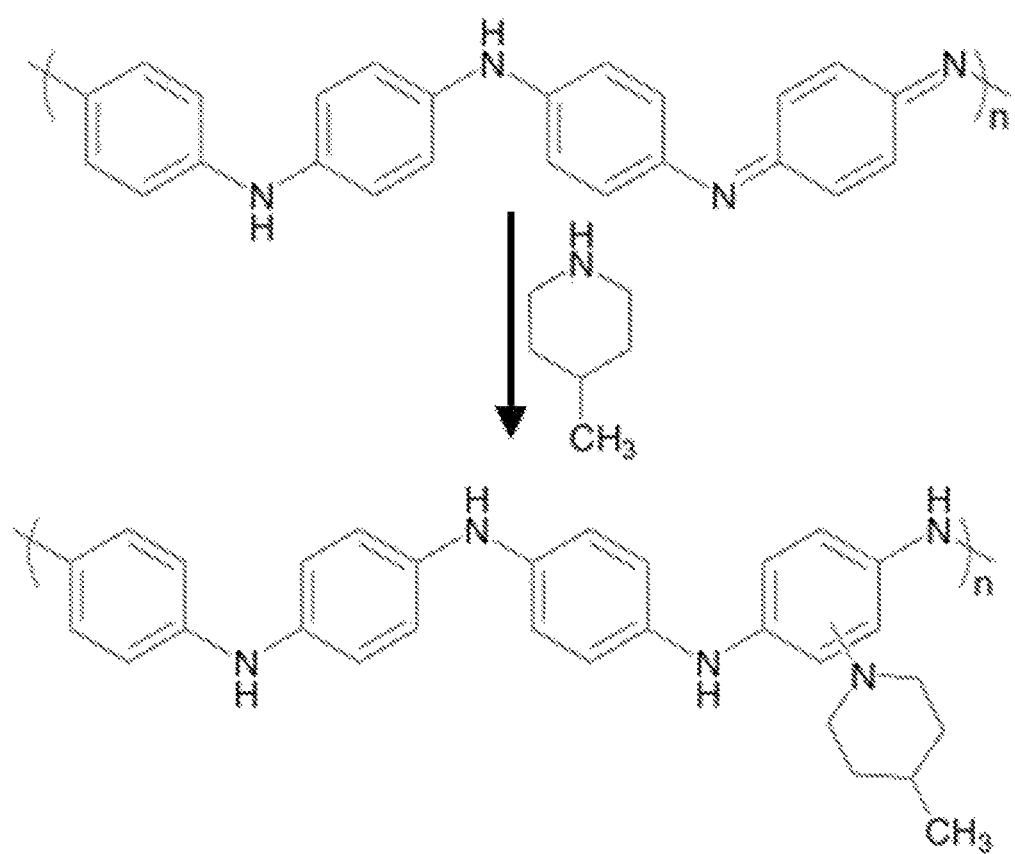
FIG. 8 shows a schematic diagram illustrating the reduction and ring substitution of 4MP onto PANi emeraldine base.

PANi-4MP hydrogen bonding and ring substitution reduce the interaction between water and the relatively hydrophilic PANi imine nitrogens. The presence of the relatively hydrophobic ring and methyl group on 4MP, as shown in FIG. 8, leads to an increase in PANi UF membrane hydrophobicity.

The membrane hydrophilicity is recovered by 1 h post-treatment using 100 mM CSA and maintained after an additional 3 h 100 mM $NH_4OH$ treatment at 50° C. The reduction in the FTIR peak at 1740 $cm^{-1}$ after $NH_4OH$ treatment (FIG. 4) along with the reduction in $^1H$ NMR peaks at δ=1.01 and 0.70 ppm in FIG. 5 f) show that the excess CSA has been removed. There may be some residual CSA dissolved in the water remaining in the $NH_4OH$-treated membrane. Membrane hydrophilicity is not recovered after a 1 h post-treatment using 100 mM $NH_4OH$ at 50° C., so this $NH_4OH$ treatment does not contribute to membrane hydrophilicity when used to remove excess CSA. Although the mechanism for hydrophilicity is uncertain, we believe there may be some strong interaction between the hydrogen-bonded 4MP and CSA that produces a more hydrophilic membrane. CSA treatment may remove the hydrogen-bonded 4MP, but only at the membrane surface. If CSA were to remove 4MP only at the exposed surfaces of a PANi-NMP-4MP membrane due to physical and/or mass transfer limitations, then $^1H$ NMR would not detect a noticeable decrease in 4MP because treated films are dissolved in a solvent for analysis and the bulk of the membrane may still contain 4MP. FTIR is a surface technique and is more sensitive to chemical changes at the membrane surface. We are unable to detect the presence or removal of 4MP from a PANi membrane perhaps due to the similar chemical structure of 4MP and PANi. Treating PANi with an acid protonates the PANi backbone and saturates the imine nitrogens with which 4MP forms hydrogen bonds. Likewise, the acid protonates 4MP and eliminates its ability to hydrogen bond with PANi. One might expect that any acid would liberate hydrogen bonded 4MP. Acids other than CSA are unable to restore membrane hydrophilicity. It is known that CSA induces an expanded coil conformation in PANi, increasing the separation between neighboring chains [54, 55]. However, PANi is normally in a tightly coiled conformation and we suspect that HCl and $H_2SO_4$ are too small to expand PANi chains sufficiently to create the free volume necessary for the outward diffusion of 4MP. The relatively 2-dimensional geometry of p-toluenesulfonic acid does not promote chain expansion and dodecylbenzenesulfonic acid is likely too large to fit between PANi chains.

Introduction of 4MP produces a less porous membrane with smaller pores. The resulting membrane is much less permeable, but has much higher protein rejection. The higher porosity and larger pores observed in CSA-post-treated membranes potentially arise due to structural re-arrangement of PANi caused by the post-treatment process such as polymer disentanglement or the like. The resulting membrane has a lower BSA rejection. These defects can be minimized by designing a more gentle post-treatment process. Although PANi membrane hydrophilicity is recovered, membrane surface charge is still shifted after CSA post-treatment. This again indicates that there can be strongly-associated 4MP remaining on the membrane surface even after CSA post-treatment.

Pure polyaniline ultrafiltration membranes with improved protein rejection have been formed with the aid of a gel-inhibiting agent, 4-methylpiperidine. These membranes, however, show decreased water permeability and increased hydrophobicity when compared to PANi membranes made from NMP only. 4MP was found to reduce the quinoid ring structure of PANi emeraldine base to the benzenoid form by ring substitution. Hydrogen-bonded and ring-substituted 4MP increased PANi membrane hydrophobicity by occupying a relatively hydrophilic imine nitrogen site and replacing it with a relatively hydrophobic ring and methyl group. Post-treatments using acid solutions indicate that the camphorsulfonate ion causes PANi to take on a more expanded coil conformation which allows the hydrogen-bonded 4MP to diffuse out of the membrane. Removal of this fraction of 4MP enabled polyaniline ultrafiltration membranes to recover their hydrophilicity. Tailoring membrane properties by a simple post-treatment step has implications for extending the range of separation performance for PANi based membranes.

Figure 9:
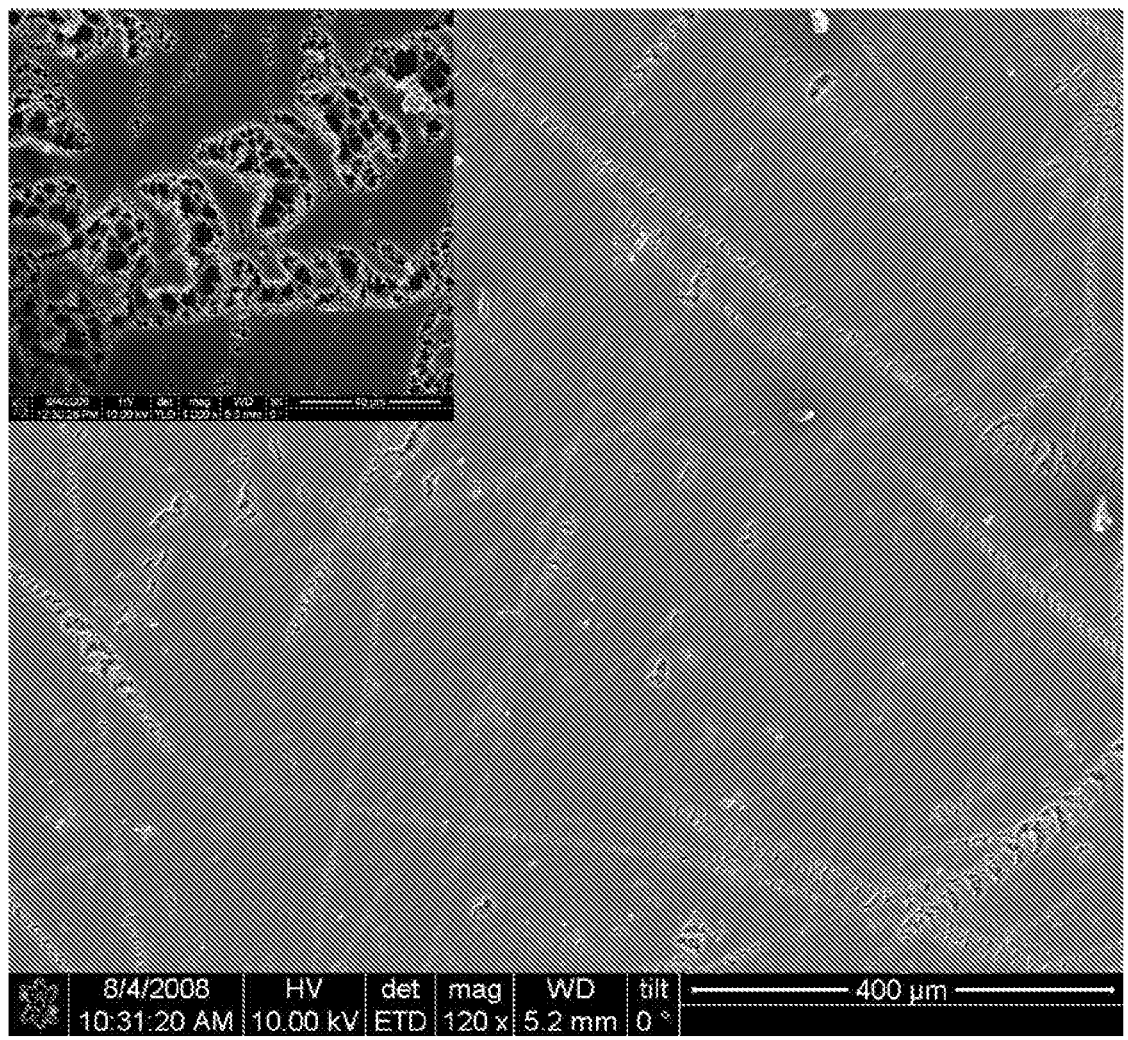
FIG. 9 shows an SEM image of a membrane made from PANi-NMP without a gel-inhibitor.
Figure 10:
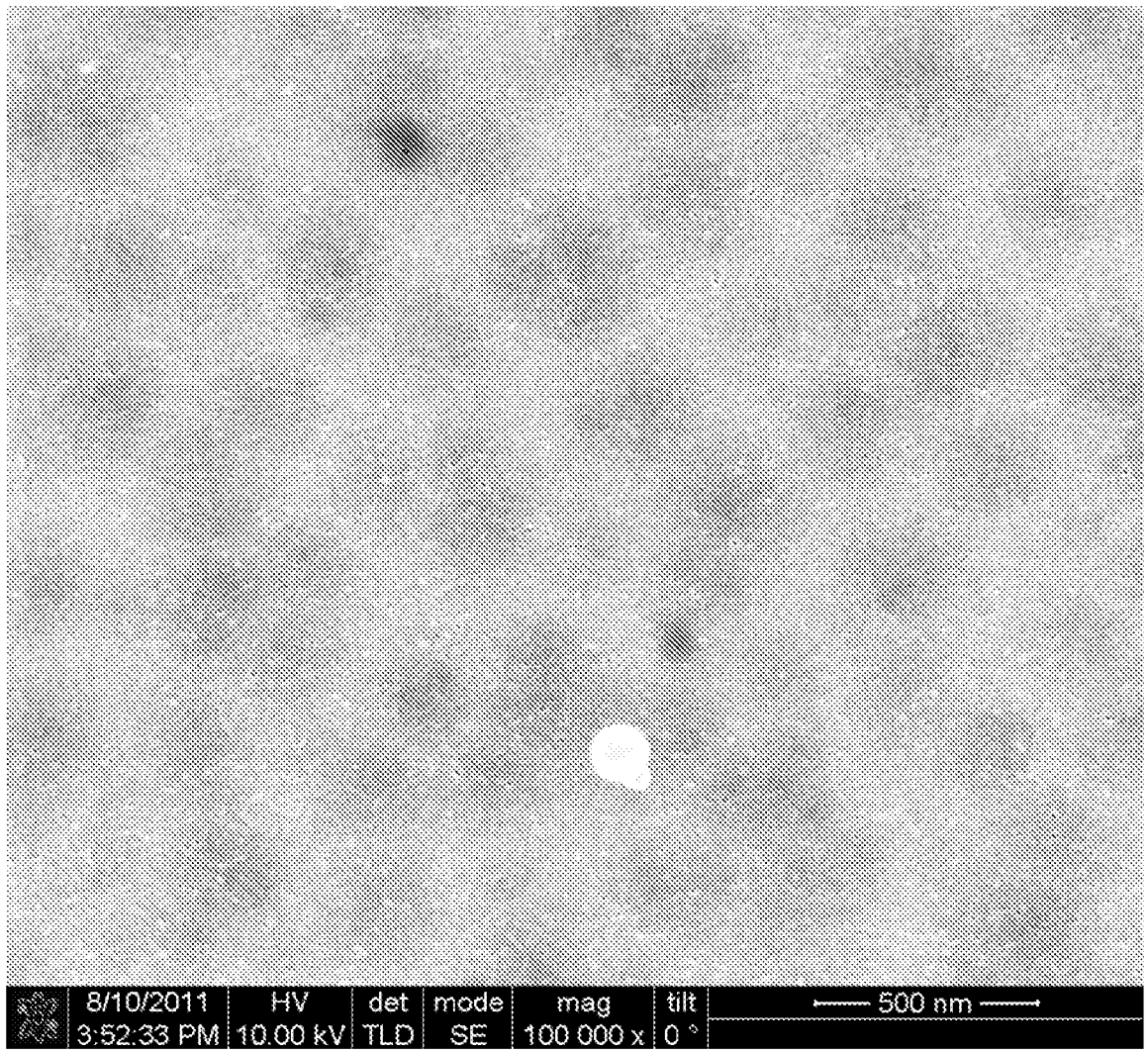
FIG. 10 shows an SEM image of a membrane made from PANi-NMP with 4-MP as a gel-inhibitor.

FIG. 9 shows an SEM image of a PANi-NMP membrane that was made without a gel-inhibiting agent. This membrane has several defects (cracks). FIG. 10 an SEM image of a PANi-NMP membrane that was made with a gel-inhibiting agent (4-MP). This membrane has no defects.

b. Example 2

(a) Measuring Contact Angles of Polar and Apolar Liquids on Polymeric Membranes

Surface tensions of microbial cells were determined from sessile drop contact angles (VCA-1000, AST Products Inc., Billerica, Mass.) of deionized water, ethylene glycol, glycerol, and diiodomethane on microbial lawns filtered onto 0.1 μm Whatman filter papers as described elsewhere. (G. A. Burks, et al., *Langmuir* 2003, 19, 2366-2371) Colloidal particles (silica, alumina and carboxyl modified latex) were from a previously published source. (J. A. Brant, et al., *Journal of Membrane Science* 2004, 241, 235-248) Surface tensions of polyaniline and post-treated polyaniline membranes were determined by measuring sessile drop contact angles of deionized water, ethylene glycol, glycerol, and diiodomethane on membrane samples mounted on glass slides with double-sided tape. At least twelve equilibrium contact angles were measured for each sample obtained directly for this study, where the equilibrium angle was determined from the average of right and left angles. The highest and lowest values were discarded before taking the average and standard deviation. Contact angles and corresponding surface tensions of other membrane materials were obtained from a previously published study. (E. R. Cornelissen, et al., *Colloids and Surfaces A: Physicochemical and Engineering Aspects* 1998, 138, 283-289)

Measured contact angles of PANi and CSA post-treated PANi ("PANi-CSA") are shown in Table 7 along with the most popular commercial polymeric membrane materials including: cellulose acetate (CA), polyacrylonitrile (PAN), polycarbonate (PC), polyetherimide (PEI), polyethersulfone (PES), polypropylene (PP), polysulfone (PSf), polytertfloroethylene (PTFE) and polyvinylidene fluoride (PVDF). The measured contact angles are all measured via the sessile drop method, and hence, directly comparable. In the case of water contact angles, the PANi membranes exhibit contact angles similar to the CA and PAN membranes, while the PANi-CSA membranes produce a distinctly lower contact angle which generally correlates with more hydrophilic and fouling resistant membrane materials.

TABLE 7

Measured contact angles (degrees) of probe liquids on membranes

| Polymers | θ, water | θ, polar * | θ, apolar ** |
|---|---|---|---|
| CA | 59 ± 3 | 54 ± 3 | 26 ± 2 |
| PAN | 57 ± 3 | 49 ± 4 | 6 ± 1 |
| PC | 78 ± 1 | 66 ± 2 | 12 ± 1 |
| PEI | 79 ± 2 | 63 ± 2 | 8 ± 1 |
| PES | 92 ± 2 | 68 ± 5 | 13 ± 2 |
| PP | 94 ± 2 | 83 ± 3 | 42 ± 1 |
| PSf | 82 ± 2 | 67 ± 4 | 14 ± 7 |
| PTFE | 117 ± 2 | 112 ± 2 | 93 ± 2 |
| PVDF | 92 ± 2 | 104 ± 3 | 29 ± 2 |
| PANi | 57 ± 5 | 36 ± 3 | 35 ± 3 |
| PANi-CSA | 41 ± 2 | 19 ± 2 | 36 ± 1 |

* ethylene glycol used here; glycerol used by Cornelissen et al.
** diiodomethane used here; a-bromonapthalene used by Cornelissen et al.

Contact angle probe liquid surface tension components (Table 8) are used to extract surface tension components of fouling materials (Table 9) and membrane materials (Table 10). What can be deduced is that PP, PVDF and PTFE are practically apolar and decidedly lower energy than all the other materials. The PANi materials exhibit similar total surface tensions as CA and PAN materials, but decidedly lower electron acceptor and higher electron donor functionality. In general, it has been observed that as materials approach monopolar electron donor or acceptor functionality they appear more hydrophilic and fouling resistant; this is well accepted for polyethlylene glycol (PEG) functionalized surfaces.

TABLE 8

Surface tension components of probe liquids

| Liquids | $\gamma^{LW}$ (mJ/m2) | $\gamma+$ (mJ/m2) | $\gamma-$ (mJ/m2) | $\gamma^{TOT}$ (mJ/m2) |
|---|---|---|---|---|
| Water | 21.8 | 25.5 | 25.5 | 72.8 |
| Glycerol | 34.0 | 3.9 | 57.4 | 64.0 |
| Ethylene Gycol | 29.0 | 1.9 | 47.0 | 48.0 |
| Diiodomethane | 50.8 | 0.0 | 0.0 | 50.8 |
| α-Bromonaphthalene | 44.4 | 0.0 | 0.0 | 44.4 |

TABLE 9

Surface tension components of model foulants

| Foulants | $\gamma^{LW}$ (mJ/m2) | $\gamma+$ (mJ/m2) | $\gamma-$ (mJ/m2) | $\gamma^{TOT}$ (mJ/m2) |
|---|---|---|---|---|
| HSA | 26.8 | 6.3 | 50.6 | 62.5 |
| PEG | 43.0 | 0.0 | 64.0 | 43.0 |
| Hexadecane | 27.5 | 0.0 | 0.0 | 27.5 |
| Silica particles (100 nm) | 34.3 | 1.0 | 31.7 | 45.8 |
| Alumina (300 nm) | 42.9 | 3.7 | 19.6 | 59.9 |
| Carboxyl modified latex | 37.5 | 0.6 | 5.3 | 41.0 |
| E. coli | 39.1 | 0.6 | 59.0 | 50.9 |
| S. cerevisiae | 14.2 | 0.5 | 44.4 | 23.8 |
| P. putida | 25.4 | 0.0 | 39.5 | 26.3 |

TABLE 10

Calculated interfacial tension components of the different polymers

| Membrane Polymers | $\gamma^{LW}$ (mJ/m2) | $\gamma+$ (mJ/m2) | $\gamma-$ (mJ/m2) | $\gamma^{TOT}$ (mJ/m2) |
|---|---|---|---|---|
| CA | 40.0 | 0.5 | 19.0 | 46.2 |
| PAN | 44.0 | 0.6 | 19.0 | 50.8 |
| PC | 44.0 | 0.1 | 5.8 | 45.5 |
| PEI | 44.0 | 0.3 | 3.9 | 46.2 |
| PES | 43.0 | 0.5 | 0.1 | 43.4 |
| PP | 34.0 | 0.0 | 1.7 | 34.0 |
| PSf | 43.0 | 0.2 | 3.1 | 44.6 |
| PTFE | 10.0 | 0.0 | 0.9 | 10.0 |
| PVDF | 40.0 | 0.0 | 0.1 | 40.0 |
| PANi-untreated | 41.9 | 0.1 | 24.6 | 44.2 |
| PANi-CSA-treated | 41.6 | 0.3 | 38.1 | 47.8 |

Figure 11:
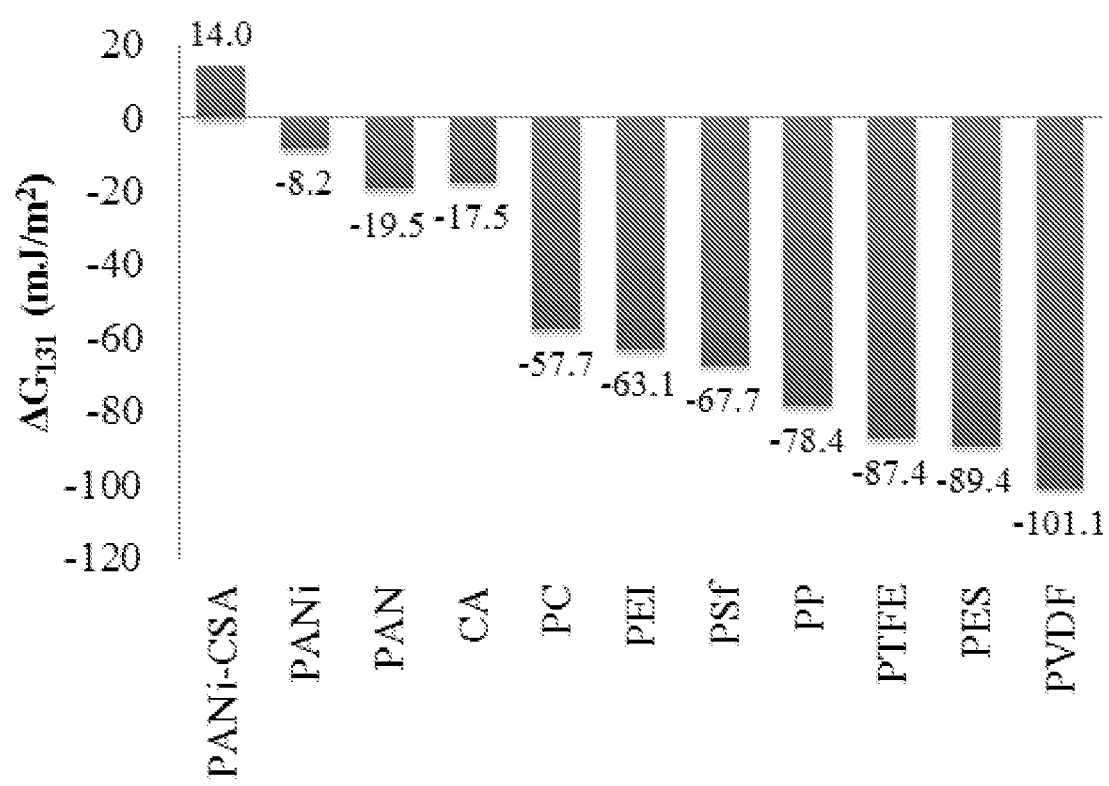
FIG. 11 shows a plot of free energy of cohesion for various membrane materials.
Figure 12:
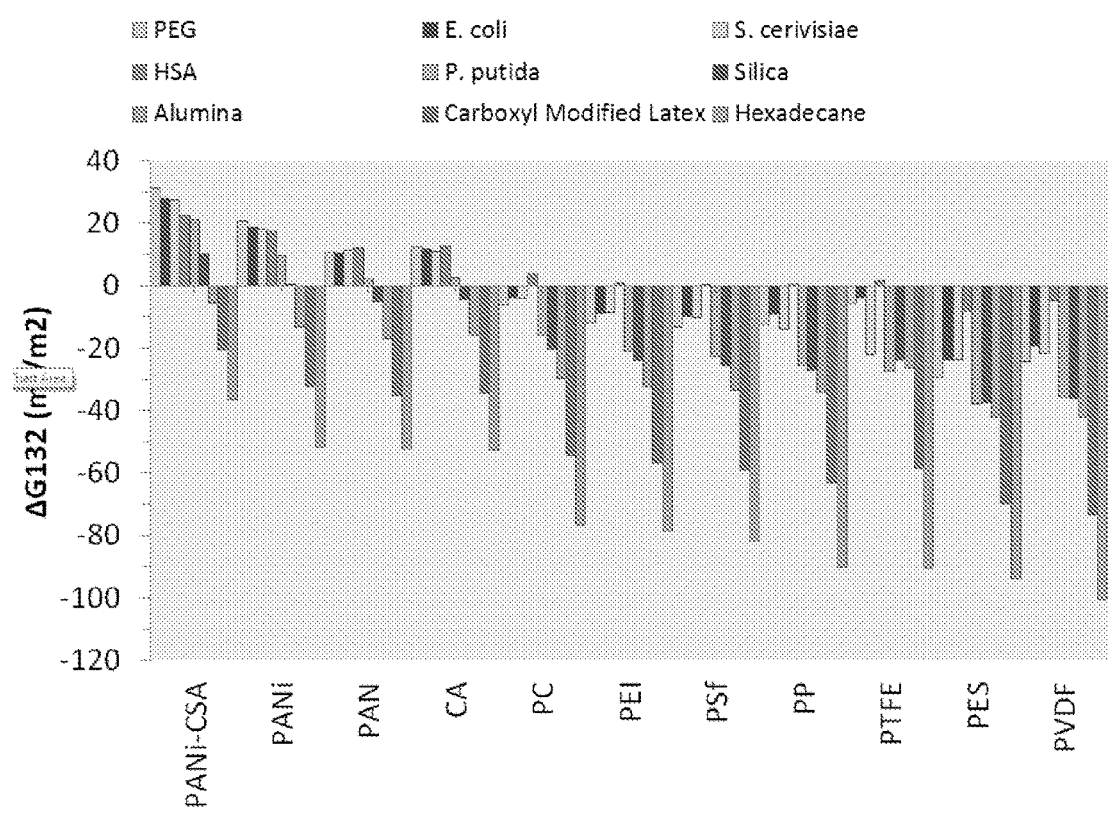
FIG. 12 shows a plot of free energy of adhesion for various membrane and fouling materials. Each of the membranes (e.g. PANi-CAS) was tested against nine fouling materials. In the plot for each membrane, from the left, the order of the fouling material is PEG, E. coli, S. cerevisiae, HSA, P. putida, silica, alumina, carboxyl modified latex, and hexadecane.

What is clear from the free energy of cohesion data (FIG. 11) is that virtually all the polymeric membranes appear "hydrophobic" according to their negative free energy of cohesion; one exception is the CSA treated PANi membrane which exhibits a significantly positive free energy of cohesion. Hence, a PANi-CSA membrane can be considered to be truly "hydrophilic." Similarly, the free energy of adhesion data (FIG. 12) indicates that the PANi membrane is along with the PAN and CA membranes among the most fouling resistant materials available, but the PANi-CSA membrane is even more fouling resistant.

REFERENCES

[1] S. Virji, R. Kojima, J. D. Fowler, R. B. Kaner, B. H. Weiller, Polyaniline nanofiber-metal salt composite materials for arsine detection, Chem. Mater., 21 (2009) 3056-3061.

[2] L. Al-Mashat, K. Shin, K. Kalantar-zadeh, J. D. Plessis, S. H. Han, R. W. Kojima, R. B. Kaner, D. Li, X. Gou, S. J. Ippolito, W. Wlodarski, Graphene/polyaniline nanocomposite for hydrogen sensing, J. Phys. Chem. B., 114 (2010) 16168-16173.

[3] Y. Liao, C. Zhang, Y. Zhang, V. Strong, J. Tang, X.-G. Li, K. Kalantar-zadeh, E. M. V. Hoek, K. L. Wang, R. B.

Kaner, Carbon nanotube/polyaniline composite nanofibers: Facile synthesis and chemosensors, Nano Lett., 11 (2011) 954-959.

[4] J. Desilvestro, W. Scheifele, O. Haas, Insitu determination of gravimetric and volumetric charge-densities of battery electrodes—polyaniline in aqueous and nonaqueous electrolytes, J. Electrochem. Soc., 139 (1992) 2727-2736.

[5] J. Joo, A. J. Epstein, Electromagnetic-radiation shielding by intrinsically conducting polymers, Appl. Phys. Let., 65 (1994) 2278-2280.

[6] D. C. Trivedi, S. K. Dhawan, Shielding of electromagnetic-interference using polyaniline, Synth. Met., 59 (1993) 267-272.

[7] J. Alam, U. Riaz, S. Ahmad, Development of nanostructured polyaniline dispersed smart anticorrosive composite coatings, Polym. Adv. Technol., 19 (2008) 882-888.

[8] W. K. Lu, R. L. Elsenbaumer, B. Wessling, Corrosion protection of mild-steel by coatings containing polyaniline, Synth. Met., 71 (1995) 2163-2166.

[9] B. Yao, G. C. Wang, J. K. Ye, X. W. Li, Corrosion inhibition of carbon steel by polyaniline nanofibers, Mat. Lett., 62 (2008) 1775-1778.

[10] Z. F. Fan, Z. Wang, M. R. Duan, J. X. Wang, S. C. Wang, Preparation and characterization of polyaniline/polysulfone nanocomposite ultrafiltration membrane, J. Membr. Sci., 310 (2008) 402-408.

[11] Z. F. Fan, Z. Wang, N. Sun, J. X. Wang, S. C. Wang, Performance improvement of polysulfone ultrafiltration membrane by blending with polyaniline nanofibers, J. Membr. Sci., 320 (2008) 363-371.

[12] G. R. Guillen, T. P. Farrell, R. B. Kaner, E. M. V. Hoek, Pore-structure, hydrophilicity, and particle filtration characteristics of polyaniline-polysulfone ultrafiltration membranes, J. Mater. Chem., 20 (2010) 4621-4628.

[13] M. Angelopoulos, G. E. Asturias, S. P. Ermer, A. Ray, E. M. Scherr, A. G. MacDiarmid, M. Akhtar, Z. Kiss, A. J. Epstein, Polyaniline—Solutions, films and oxidation-state, Mol. Cryst. Liq. Cryst., 160 (1988) 151-163.

[14] C. C. Han, R. C. Jeng, Concurrent reduction and modification of polyaniline emeraldine base with pyrrolidine and other nucleophiles, Chem. Commun., 6 (1997) 553-554.

[15] D. L. Yang, B. R. Mattes, Polyaniline emeraldine base in N-methyl-2-pyrrolidinone containing secondary amine additives: A rheological investigation of solutions, J. Polym. Sci. Pol. Phys., 40 (2002) 2702-2713.

[16] J. Stejskal, P. Kratochvil, N. Gospodinova, L. Terlemezyan, P. Mokreva, Polyaniline dispersions—Preparation of spherical-particles and their light-scattering characterization, Polymer, 33 (1992) 4857-4858.

[17] Y. H. Liao, T. K. Kwei, K. Levon, Investigation of the aggregation phenomenon of polyaniline in dilute-solutions, Macromol. Chem. Physic., 196 (1995) 3107-3116.

[18] M. Angelopoulos, Y. H. Liao, B. Furman, T. Graham, LiCl induced morphological changes in polyaniline base and their effect on the electronic properties of the doped form, Macromolecules, 29 (1996) 3046-3049.

[19] O. Oka, S. Morita, K. Yoshino, Gel characteristics of polyaniline and its anomalous doping effect, Jpn. J. Appl. Phys. 2, 29 (1990) L679-L682.

[20] E. J. Oh, Y. Min, J. M. Wiesinger, S. K. Manohar, E. M. Scherr, P. J. Prest, A. G. Macdiarmid, Polyaniline: Dependency of selected properties on molecular weight, Synth. Met., 55-57 (1993) 977-982.

[21] K. Tzou, R. V. Gregory, Mechanically strong, flexible highly conducting polyaniline structures formed from polyaniline gels, Synth. Met., 55 (1993) 983-988.

[22] B. R. Mattes, H. L. Wang, D. Yang, Y. T. Zhu, W. R. Blumenthal, M. F. Hundley, Formation of conductive polyaniline fibers derived from highly concentrated emeraldine base solutions, Synth. Met., 84 (1997) 45-49.

[23] H. L. Wang, B. R. Mattes, Permeable polyaniline articles for gas separation, in, U.S. Pat. No. 6,797,325 B2, 2004.

[24] B. R. Mattes, H. L. Wang, D. Yang, Electrically conductive polyaniline fibers prepared by wet-dry spinning techniques, ANTEC, (1997) 1463-1467.

[25] H. L. Wang, R. J. Romero, B. R. Mattes, Y. T. Zhu, M. J. Winokur, Effect of processing conditions on the properties of high molecular weight conductive polyaniline fiber, J. Polym. Sci. Pol. Phys., 38 (2000) 194-204.

[26] D. Yang, B. R. Mattes, Investigation of gel inhibitor assisted dissolution of polyaniline: A case study for emeraldine base, 2-methyl-aziridine, and N-methyl-pyrrolidone, Synth. Met., 101 (1999) 746-749.

[27] D. L. Yang, B. R. Mattes, Polyaniline emeraldine base in N-methyl-2-pyrrolidinone containing secondary amine additives B—characterization of solutions and thin films, Synth. Met., 129 (2002) 249-260.

[28] D. L. Yang, G. Zuccarello, B. R. Mattes, Physical stabilization or chemical degradation of concentrated solutions of polyaniline emeraldine base containing secondary amine additives, Macromolecules, 35 (2002) 5304-5313.

[29] L. W. Shacklette, R. H. Baughman, Defect generation and charge transport in polyaniline, Mol. Cryst. Liq. Cryst., 189 (1990) 193-212.

[30] D. Yang, The dissolution of high molecular weight polyaniline emeraldine base in N-methyl-2-pyrrolidinone containing secondary amines: Thermodynamics and characterization, in, University of California, Los Angeles, 1999.

[31] T. L. Young, M. P. Espe, D. Yang, B. R. Mattes, Application of solid-state NMR to characterize the interaction of gel inhibitors with emeraldine base polyaniline, Macromolecules, 35 (2002) 5565-5569.

[32] M. Ulbricht, G. Belfort, Surface modification of ultrafiltration membranes by low temperature plasma. 2. Graft polymerization onto polyacrylonitrile and polysulfone, J. Membr. Sci., 111 (1996) 193-215.

[33] A. Nabe, E. Staude, G. Belfort, Surface modification of polysulfone ultrafiltration membranes and fouling by BSA solutions, J. Membr. Sci., 133 (1997) 57-72.

[34] S. S. Madaeni, A. G. Fane, D. E. Wiley, Factors influencing critical flux in membrane filtration of activated sludge, J. Chem. Technol. Biot., 74 (1999) 539-543.

[35] J. Pieracci, J. V. Crivello, G. Belfort, Photochemical modification of 10 kDa polyethersulfone ultrafiltration membranes for reduction of biofouling, J. Membr. Sci., 156 (1999) 223-240.

[36] J. A. Koehler, M. Ulbricht, G. Belfort, Intermolecular forces between a protein and a hydrophilic modified polysulfone film with relevance to filtration, Langmuir, 16 (2000) 10419-10427.

[37] M. Taniguchi, G. Belfort, Low protein fouling synthetic membranes by UV-assisted surface grafting modification: Varying monomer type, J. Membr. Sci., 231 (2004) 147-157.

[38] S. Kang, E. M. V. Hoek, H. Choi, H. Shin, Effect of membrane surface properties during the fast evaluation of cell attachment, Separ. Sci. Technol., 41 (2006) 1475-1487.

[39] S. Kim, E. M. V. Hoek, Interactions controlling biopolymer fouling of reverse osmosis membranes, Desalination, 202 (2007) 333-342.

[40] S. Lee, S. Kim, J. Cho, E. M. V. Hoek, Natural organic matter fouling due to foulant-membrane physicochemical interactions, Desalination, 202 (2007) 377-384.

[41] E. K. Lee, V. Chen, A. G. Fane, Natural organic matter (NOM) fouling in low pressure membrane filtration—effect of membranes and operation modes, Desalination, 218 (2008) 257-270.

[42] X. Jin, X. Huang, E. M. V. Hoek, Role of specific ion interactions in seawater RO membrane fouling by alginic acid, Environ. Sci. Technol., 43 (2009) 3580-3587.

[43] A. Rahimpour, S. S. Madaeni, S. Zereshki, Y. Mansourpanah, Preparation and characterization of modified nano-porous PVDF membrane with high antifouling property using UV photo-grafting, Appl. Surf. Sci., 255 (2009) 7455-7461.

[44] S. S. Madaeni, N. Ghaemi, A. Alizadeh, M. Joshaghani, Influence of photo-induced superhydrophilicity of titanium dioxide nanoparticles on the anti-fouling performance of ultrafiltration membranes, Appl. Surf. Sci., 257 (2011) 6175-6180.

[45] G. R. Guillen, Y. Pan, M. Li, E. M. V. Hoek, Preparation and characterization of membranes formed by nonsolvent induced phase separation: A review, Ind. Eng. Chem. Res., 50 (2011) 3798-3817.

[46] M. Mulder, Basic principles of membrane technology, second ed., Kluwer Academic Publishers, Dordrecht, The Netherlands, 2003.

[47] N. O. Becht, D. J. Malik, E. S. Tarleton, Evaluation and comparison of protein ultrafiltration test results: Dead-end stirred cell compared with a cross-flow system, Sep. Purif. Technol., 62 (2008) 228-239.

[48] S. T. Kang, A. Subramani, E. M. V. Hoek, M. A. Deshusses, M. R. Matsumoto, Direct observation of biofouling in cross-flow microfiltration: Mechanisms of deposition and release, J. Membr. Sci., 244 (2004) 151-165.

[49] R. D. Shannon, Revised effective ionic-radii and systematic studies of interatomic distances in halides and chalcogenides, Acta Crystallogr. A., 32 (1976) 751-767.

[50] R. M. Silverstein, G. C. Bassler, T. C. Merrill, Chpt. 3—Infrared Spectroscopy, in: Spectrometric identification of organic compounds, John Wiley & Sons, Inc., New York, 1991, pp. 91-164.

[51] J. S. Tang, X. B. Jing, B. C. Wang, F. S. Wang, Infrared-spectra of soluble polyaniline, Synth. Met., 24 (1988) 231-238.

[52] I. Harada, Y. Furukawa, F. Ueda, Vibrational-spectra and structure of polyaniline and related-compounds, Synth. Met., 29 (1989) E303-E312.

[53] S. Quillard, G. Louarn, S. Lefrant, A. G. MacDiarmid, Vibrational analysis of polyaniline—A comparative-study of leucoemeraldine, emeraldine, and pernigraniline bases, Phys. Rev. B., 50 (1994) 12496-12508.

[54] Y. Wang, H. D. Tran, L. Liao, X. Duan, R. B. Kaner, Nanoscale morphology, dimensional control, and electrical properties of oligoanilines, J. Am. Chem. Soc., 132 (2010) 10365-10373.

[55] A. G. MacDiarmid, A. J. Epstein, Secondary doping in polyaniline, Synth. Met., 69 (1995) 85-92.

[56] B. Massoumi, H. Aghili, A. Entezami, Investigation of electrochemical copolymerization of 1-naphthylamineaniline in the presence of various organic sulfonic acids, J. Chin. Chem. Soc.-Taip., 56 (2009) 741-747.

What is claimed is:

1. A method of increasing membrane hydrophilicity comprising:
   a) providing a membrane comprising polyaniline, a polyaniline derivative, or copolymer thereof and one or more gel-inhibiting agents comprising a primary amine, a secondary amine, or a tertiary amine, or a combination thereof;
   b) treating the membrane with one or more hydrophilicity-restoration agents selected from organic acids in an amount and for a time sufficient to increase the hydrophilicity of the membrane; and
   c) treating the membrane in order to remove all of the organic acid.

2. The method of claim 1, wherein the one or more gel-inhibiting agents comprises 4-methylpiperidine, n-Butylamine, 2,5-dimethyl-3-pyrroline, 3,3-dimethylpiperidine, heptamethyleneimine, diisopropylamine, hexamethyleneimine, N-ethylbenzylamine, piperazine, 2,6-dimethylmorpholine, piperidine, dibutylamine, N-methylpiperidine, N,N'-dimethylpiperazine, triethylamine, or diethylnicotinamide, or a combination thereof.

3. The method of claim 1, wherein the one or more hydrophilicity-restoration agents comprises (+/−) camphor-10-sulfonic acid, methane sulfonic acid, ethane sulfonic acid, propanesulfonic acid, perfluoropropanesulfonic acid, butane sulfonic acid, perfluorobutane sulfonic acid, hexane sulfonic acid, perfluorohexane sulfonic acid, perfluorooctanesulfonic acid, benzene sulfonic acid, toluene sulfonic acid, dodecyl benzene sulfonic acid, taurine, homotaurine, naphthalene sulfonic acid, 2,5-naphthalene disulfonic acid, dinonylnaphthalene sulfonic acid, dinonylnaphthalene disulfonic acid, polyvinylsulfonate, or polystyrenesulfonate, or a combination thereof.

4. The method of claim 1, wherein the one or more hydrophilicity-restoration agents comprises (+/−) camphor-10-sulfonic acid.

5. The method of claim 1, wherein the membrane has a positive value of $\Delta G_{131}^{IF}$ of at least 5 mJ/m$^2$ after treatment.

6. The method of claim 1, wherein the membrane has a positive value of $\Delta G_{131}^{IF}$ after treatment.

7. The method of claim 1, wherein the membrane has a positive value of $\Delta G_{132}^{IF}$ as measured against silica, polyethylene glycol (PEG), human serum albumin (HSA), *E. coli*, *S. cerevisiae*, or *P. putida* after treatment.

* * * * *